United States Patent
Sampath et al.

(10) Patent No.: US 10,313,838 B2
(45) Date of Patent: Jun. 4, 2019

(54) METHOD AND APPARATUS FOR ASSISTED POSITIONING IN A WIRELESS COMMUNICATION SYSTEM

(71) Applicant: QUALCOMM Incorporated, San Diego, CA (US)

(72) Inventors: Ashwin Sampath, Skillman, NJ (US); Raja Sekhar Bachu, Somerset, NJ (US); Nathan Edward Tenny, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 176 days.

(21) Appl. No.: 15/056,793

(22) Filed: Feb. 29, 2016

(65) Prior Publication Data

US 2017/0026799 A1 Jan. 26, 2017

Related U.S. Application Data

(62) Division of application No. 12/774,410, filed on May 5, 2010, now Pat. No. 9,277,523.
(Continued)

(51) Int. Cl.
*H04L 27/28* (2006.01)
*H04W 4/02* (2018.01)
(Continued)

(52) U.S. Cl.
CPC ............ *H04W 4/025* (2013.01); *H04W 4/02* (2013.01); *H04W 8/22* (2013.01); *H04W 48/20* (2013.01); *H04W 64/00* (2013.01)

(58) Field of Classification Search
CPC ............... H04L 5/0053; H04L 5/0092; H04L 27/2613; H04L 27/2655; H04L 5/0023;
(Continued)

(56) References Cited

U.S. PATENT DOCUMENTS 8,862,157 B2   10/2014   Han et al.
9,215,054 B2 * 12/2015   Han ..................... H04J 11/0079
(Continued)

*Primary Examiner* — Khawar Iqbal
(74) *Attorney, Agent, or Firm* — Thien T. Nguyen

(57) ABSTRACT

Systems and methodologies are described herein that facilitate reduced complexity network-assisted device positioning in a wireless communication system. As described herein, a mobile device and/or other suitable device can utilize positioning assistance messages received from a location server, a serving network cell, and/or other entities, to assist in position fixing based on reference signals (e.g., positioning reference signals (PRSs)) detected from nearby network cells. Positioning assistance messages as described herein can include, for example, information relating to PRS bandwidths, transmit antenna configurations, and/or other parameters of respective cells from which reference signals are detected by a device during positioning. As further described herein, messaging load can be reduced by providing bandwidth and/or antenna configuration information relative to a given reference cell, such that parameters of non-reference cells that are equivalent to corresponding parameters of the reference cell can be omitted from transmitted positioning assistance data.

19 Claims, 16 Drawing Sheets

Related U.S. Application Data

(60) Provisional application No. 61/259,056, filed on Nov. 6, 2009, provisional application No. 61/258,540, filed on Nov. 5, 2009.

(51) Int. Cl.
  *H04W 8/22* (2009.01)
  *H04W 48/20* (2009.01)
  *H04W 64/00* (2009.01)

(58) Field of Classification Search
  CPC ............. H04L 25/0204; H04L 27/2657; H04L 25/0228; H04L 25/0216; H04L 27/26; H04W 56/00; H04W 64/00; H04W 4/02; H04W 24/00; H04B 7/212
  USPC ........................... 455/450, 428, 456.1–456.6
  See application file for complete search history.

(56) References Cited

U.S. PATENT DOCUMENTS

| | | |
|---|---|---|
| 2010/0195566 A1 | 8/2010 | Krishnamurthy et al. |
| 2010/0239034 A1* | 9/2010 | Lee ...................... H04L 5/0053 375/260 |
| 2010/0272004 A1 | 10/2010 | Maeda et al. |
| 2010/0273506 A1 | 10/2010 | Stern-Berkowitz et al. |
| 2010/0317343 A1 | 12/2010 | Krishnamurthy et al. |
| 2010/0322184 A1 | 12/2010 | Xiao |
| 2011/0039577 A1* | 2/2011 | Stern-Berkowitz .......... G01S 5/0205 455/456.1 |
| 2011/0117925 A1 | 5/2011 | Sampath et al. |
| 2011/0124347 A1 | 5/2011 | Chen et al. |
| 2011/0212730 A1 | 9/2011 | Wennstrom et al. |
| 2011/0216732 A1* | 9/2011 | Maeda ................... H04W 4/08 370/329 |
| 2011/0312339 A1 | 12/2011 | Kuningas et al. |
| 2012/0021769 A1* | 1/2012 | Lindoff ................ G01S 5/0063 455/456.1 |
| 2012/0027110 A1 | 2/2012 | Han et al. |
| 2012/0044796 A1 | 2/2012 | Yoon et al. |
| 2012/0108270 A1* | 5/2012 | Kazmi .................. H04W 64/00 455/456.5 |
| 2012/0264450 A1 | 10/2012 | Kangas et al. |
| 2012/0309426 A1* | 12/2012 | Lee ....................... H04L 5/0053 455/456.3 |
| 2013/0003585 A1 | 1/2013 | Siomina et al. |
| 2013/0315168 A1* | 11/2013 | Frank .................... G01S 5/0205 370/329 |
| 2014/0226593 A1* | 8/2014 | Han .................... H04W 74/006 370/329 |
| 2016/0261386 A1* | 9/2016 | Song ................. H04W 36/0072 |
| 2017/0135062 A1* | 5/2017 | Stern-Berkowitz .......... G01S 5/0205 |

* cited by examiner

METHOD AND APPARATUS FOR ASSISTED POSITIONING IN A WIRELESS COMMUNICATION SYSTEM

CROSS-REFERENCE

This application is a divisional of U.S. application Ser. No. 12/774,410, filed May 5, 2010, and entitled "METHOD AND APPARATUS FOR ASSISTED POSITIONING IN A WIRELESS COMMUNICATION SYSTEM," said application claiming priority to U.S. Provisional Application No. 61/258,540, filed Nov. 5, 2009, and entitled "METHOD AND APPARATUS FOR RRC-SUPPORTED POSITIONING IN A WIRELESS COMMUNICATION SYSTEM," and further claiming priority to U.S. Provisional Application No. 61/259,056, filed Nov. 6, 2009, and entitled "METHOD AND APPARATUS FOR RRC-SUPPORTED POSITIONING IN A WIRELESS COMMUNICATION SYSTEM," the entirety of which are incorporated herein by reference.

BACKGROUND

I. Field

The present disclosure relates generally to wireless communications, and more specifically to techniques for determining position of respective devices operating in a wireless communication system.

II. Background

Wireless communication systems are widely deployed to provide various communication services; for instance, voice, video, packet data, broadcast, and messaging services can be provided via such wireless communication systems. These systems can be multiple-access systems that are capable of supporting communication for multiple terminals by sharing available system resources. Examples of such multiple-access systems include Code Division Multiple Access (CDMA) systems, Time Division Multiple Access (TDMA) systems, Frequency Division Multiple Access (FDMA) systems, and Orthogonal Frequency Division Multiple Access (OFDMA) systems.

Generally, a wireless multiple-access communication system can simultaneously support communication for multiple wireless terminals. In such a system, each terminal can communicate with one or more base stations via transmissions on the forward and reverse links. The forward link (or downlink) refers to the communication link from the base stations to the terminals, and the reverse link (or uplink) refers to the communication link from the terminals to the base stations. This communication link can be established via a single-in-single-out (SISO), multiple-in-signal-out (MISO), or a multiple-in-multiple-out (MIMO) system.

Mobile devices and/or other devices operating in a wireless communication system can ascertain their present location by performing position fixing (also referred to herein as positioning, position estimation, etc.) in a variety of manners. For example, positioning reference signals (PRSs) and/or other suitable signals can be transmitted by various network cells within range of a mobile device, and upon receipt of such signals the mobile device can utilize time difference of arrival (TDOA) and/or other suitable techniques to estimate a current position. To aid in device positioning in a wireless communication system, to reduce the required complexity of positioning implementations employed within a wireless communication device, and/or to provide other suitable benefits, it would be desirable to implement techniques for assisting a device in conducting position fixing in a wireless communication environment.

SUMMARY

The following presents a simplified summary of various aspects of the claimed subject matter in order to provide a basic understanding of such aspects. This summary is not an extensive overview of all contemplated aspects, and is intended to neither identify key or critical elements nor delineate the scope of such aspects. Its sole purpose is to present some concepts of the disclosed aspects in a simplified form as a prelude to the more detailed description that is presented later.

According to an aspect, a method is described herein. The method can comprise identifying a group of network cells; obtaining information relating to the group of network cells, the information comprising at least one of a bandwidth or a number of transmit antennas utilized by respective network cells in the group of network cells; and generating at least one positioning assistance message that includes at least a portion of the information.

A second aspect described herein relates to a wireless communications apparatus, which can comprise a memory that stores data relating to a group of network cells. The wireless communications apparatus can further comprise a processor configured to obtain information relating to the group of network cells, the information comprising at least one of a bandwidth or a number of transmit antennas utilized by respective network cells in the group of network cells, and to generate at least one positioning assistance message that includes at least a portion of the information.

A third aspect relates to an apparatus, which can comprise means for receiving network cell information that includes at least one of a bandwidth or a transmit antenna configuration utilized by a reference cell or a neighboring network cell that neighbors a serving network cell for one or more mobile users and means for generating positioning assistance messaging according to the network cell information.

A fourth aspect described herein relates to a computer program product, which can include a computer-readable medium that comprises code for causing a computer to receive network cell information that includes at least one of a bandwidth or a transmit antenna configuration utilized by a reference cell or a neighboring network cell that neighbors a serving network cell for one or more mobile users and code for causing a computer to generate positioning assistance messaging according to the network cell information.

According to a fifth aspect, a method is described herein that can comprise identifying a location server and a set of information relating to at least one of a utilized bandwidth or a number of employed transmit antennas and conveying at least a portion of the set of information relating to a utilized bandwidth or a number of employed transmit antennas to the location server to facilitate generation of positioning assistance messaging at the location server according to information conveyed to the location server.

A sixth aspect described herein relates to a wireless communications apparatus, which can comprise a memory that stores data relating to a location server and a set of information, wherein the set of information relates to at least one of a utilized bandwidth or a number of employed transmit antennas. The wireless communications apparatus can further comprise a processor configured to convey at least a portion of the set of information to the location server to facilitate generation of positioning assistance messaging at the location server according to information conveyed to the location server.

A seventh aspect relates to an apparatus, which can comprise means for identifying a set of information, wherein the set of information relates to at least one of an associated bandwidth or a deployed transmit antenna configuration and means for communicating at least a portion of the set of information to a location server in connection with generation of positioning assistance messaging.

An eighth aspect described herein relates to a computer program product, which can include a computer-readable medium that comprises code for causing a computer to identify a set of information, wherein the set of information relates to at least one of an associated bandwidth or a deployed transmit antenna configuration and code for causing a computer to communicate at least a portion of the set of information to a location server in connection with generation of positioning assistance messaging.

According to a ninth aspect, a method is described herein that can comprise receiving a positioning assistance message, the positioning assistance message comprising respective parameters relating to a reference base station and one or more indicator fields relating to at least one non-reference base station; setting respective parameters of the at least one non-reference base station noted by one or more indicator fields as substantially identical to corresponding parameters of the reference base station to the corresponding parameters of the reference base station; and receiving supplemental information relating to respective parameters of the at least one non-reference base station noted by one or more indicator fields as different from corresponding parameters of the reference base station.

A tenth aspect described herein relates to a wireless communications apparatus, which can comprise a memory that stores data relating to a reference base station and at least one non-reference base station. The wireless communications apparatus can further comprise a processor configured to receive a positioning assistance message that includes respective parameters relating to the reference base station and one or more indicator fields relating to the at least one non-reference base station, to set respective parameters of the at least one non-reference base station to corresponding parameters of the reference base station upon determining that the one or more indicator fields indicate that the respective parameters of the at least one non-reference base station are substantially identical to the corresponding parameters of the reference base station, and to receive supplemental information relating to respective parameters of the at least one non-reference base station upon determining that the one or more indicator fields indicate that the respective parameters of the at least one non-reference base station are different from corresponding parameters of the reference base station.

An eleventh aspect relates to an apparatus, which can comprise means for receiving positioning assistance messaging that includes respective reference cell parameters and respective flag fields relating to one or more non-reference cells; means for setting respective values of non-reference cell parameters indicated by one or more flag fields as equivalent to corresponding reference cell parameters to respective values of the corresponding reference cell parameters; and means for identifying supplemental information that includes respective values of non-reference cell parameters that are indicated by one or more flag fields as not equivalent to corresponding reference cell parameters.

A twelfth aspect described herein relates to a computer program product, which can include a computer-readable medium that comprises code for causing a computer to receive positioning assistance messaging that includes respective reference cell parameters and respective flag fields relating to one or more non-reference cells; code for causing a computer to set respective values of non-reference cell parameters indicated by one or more flag fields as equivalent to corresponding reference cell parameters to respective values of the corresponding reference cell parameters; and code for causing a computer to identify supplemental information that includes respective values of non-reference cell parameters that are indicated by one or more flag fields as not equivalent to corresponding reference cell parameters.

According to a thirteenth aspect, a method is described herein that can comprise identifying a reference cell and one or more neighbor cells; obtaining information relating to a positioning reference signal (PRS) bandwidth and an antenna port configuration utilized by the reference cell and the one or more neighbor cells; constructing a PRS information element for the reference cell that includes at least the PRS bandwidth utilized by the reference cell; obtaining information relating to PRS bandwidth and antenna port configurations utilized by the one or more neighbor cells to the reference cell; generating neighbor cell information elements for respective neighbor cells, wherein a neighbor cell information element for a corresponding neighbor cell includes an antenna port configuration utilized by the corresponding neighbor cell if the antenna port configuration utilized by the corresponding neighbor cell differs from the antenna port configuration utilized by the reference cell, a PRS information element for the corresponding neighbor cell if the PRS bandwidth utilized by the corresponding neighbor cell differs from the PRS bandwidth utilized by the reference cell, and respective flags indicating presence or absence of an antenna port configuration or a PRS information element in the neighbor cell information element; and constructing at least one positioning assistance message that includes the PRS information element for the reference cell and a list of respectively generated neighbor cell information elements.

To the accomplishment of the foregoing and related ends, one or more aspects of the claimed subject matter comprise the features hereinafter fully described and particularly pointed out in the claims. The following description and the annexed drawings set forth in detail certain illustrative aspects of the claimed subject matter. These aspects are indicative, however, of but a few of the various ways in which the principles of the claimed subject matter can be employed. Further, the disclosed aspects are intended to include all such aspects and their equivalents.

DETAILED DESCRIPTION

Figure 1:
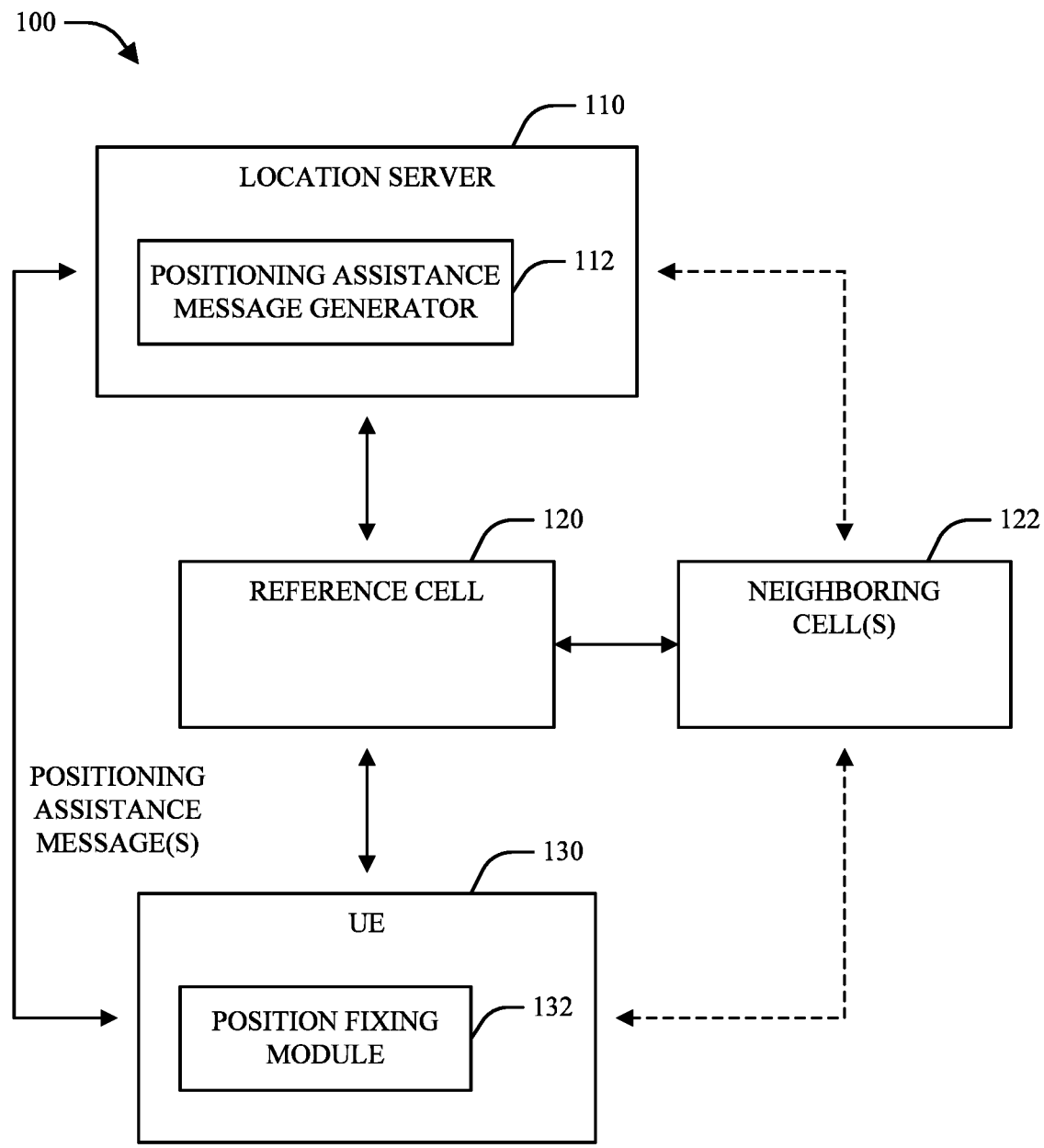
FIG. 1 is a block diagram of a system for conducting network-assisted positioning in a wireless communication system in accordance with various aspects.

Various aspects of the claimed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

As used in this application, the terms "component," "module," "system," and the like are intended to refer to a computer-related entity, either hardware, firmware, a combination of hardware and software, software, or software in execution. For example, a component can be, but is not limited to being, a process running on a processor, an integrated circuit, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a wireless terminal and/or a base station. A wireless terminal can refer to a device providing voice and/or data connectivity to a user. A wireless terminal can be connected to a computing device such as a laptop computer or desktop computer, or it can be a self contained device such as a personal digital assistant (PDA). A wireless terminal can also be called a system, a subscriber unit, a subscriber station, mobile station, mobile, remote station, access point, remote terminal, access terminal, user terminal, user agent, user device, or user equipment (UE). A wireless terminal can be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem. A base station (e.g., access point or Node B) can refer to a device in an access network that communicates over the air-interface, through one or more sectors, with wireless terminals. The base station can act as a router between the wireless terminal and the rest of the access network, which can include an Internet Protocol (IP) network, by converting received air-interface frames to IP packets. The base station also coordinates management of attributes for the air interface.

Moreover, various functions described herein can be implemented in hardware, software, firmware, or any combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc (BD), where disks usually reproduce data magnetically and discs reproduce data optically with lasers. Combinations of the above should also be included within the scope of computer-readable media.

Various techniques described herein can be used for various wireless communication systems, such as Code Division Multiple Access (CDMA) systems, Time Division Multiple Access (TDMA) systems, Frequency Division Multiple Access (FDMA) systems, Orthogonal Frequency Division Multiple Access (OFDMA) systems, Single Carrier FDMA (SC-FDMA) systems, and other such systems. The terms "system" and "network" are often used herein interchangeably. A CDMA system can implement a radio technology such as Universal Terrestrial Radio Access (UTRA), CDMA2000, etc. UTRA includes Wideband-CDMA (W-CDMA) and other variants of CDMA. Additionally, CDMA2000 covers the IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Further, CDMA2000 and UMB are described in documents from an organization named "3rd Generation Partnership Project 2" (3GPP2).

Various aspects will be presented in terms of systems that can include a number of devices, components, modules, and the like. It is to be understood and appreciated that the various systems can include additional devices, components, modules, etc. and/or omit some or all of the devices, components, modules etc. discussed in connection with the figures. A combination of these approaches can also be used.

Referring now to the drawings, FIG. 1 illustrates a system 100 for conducting network-assisted positioning in a wireless communication system in accordance with various aspects described herein. As FIG. 1 illustrates, system 100 can include one or more network cells (e.g., base stations, access points (APs), Node Bs or Evolved Node Bs (eNBs), etc.), such as a reference cell 120 and one or more neighboring cells 122. In one example, reference cell 120 and/or neighboring cell(s) 122 or other non-reference cells can communicate with one or more user equipment units (UEs also referred to herein as access terminals (ATs), mobile terminals, etc.) 130. Reference cell 120 and/or one or more of neighboring cell(s) 122 can be a serving network cell for UE 130 such that UE 130 can engage in one or more uplink (UL, also referred to as reverse link (RL)) communications with its serving cell(s) and the serving cell(s) can engage in one or more downlink (DL, also referred to as forward link (FL)) communications to UE 130. However, it should be appreciated that reference cell 120, as well as neighboring cell(s) 122, can be either serving cells or non-serving cells for a given UE 130 at any given time.

In accordance with one aspect, UE 130 and/or other entities within system 100 can fix the position of UE 130 using various methods. For example, a triangulation method can be utilized, wherein timing measurements are made on reference signals (e.g., positioning reference signals (PRSs)) and/or other highly detectable pilot signals, etc., transmitted by reference cell 120 and/or neighboring cell(s) 122. As used generally herein, a "neighboring cell" or "neighbor cell" is used to refer to a cell that neighbors a serving network cell for a given UE 130. However, it should be appreciated that other suitable network cells, such as network cells that border a designated reference cell 120, could additionally be utilized as described herein. As shown in system 100, UE 130 can utilize a position fixing module 132 and/or other suitable means to perform position fixing within system 100. In one example, UE 130 can utilize positioning assistance data, such as relative transmit time differences between different reference cells 120 and/or neighboring cells 122, locations of the nearest reference cells 120 and/or neighboring cells 122, time offsets between reference signals transmitted by respective network cells, or the like, to enable a position fix, reduce complexity of measurements, improve performance of UE 130, and/or other suitable ends. For example, as the complexity of TDOA measurements can vary depending on the amount of assistance data available at UE 130, it can be appreciated that position fixing module 132 can be implemented at UE 130 with reduced complexity in the presence of enhanced assistance data.

As further shown in FIG. 1, the above and/or other suitable assistance data can be obtained by UE 130 from a location server 110 associated with system 100. In one example, location server 110 can be a Serving Mobile Location Center (SMLC), an Evolved SMLC (E-SMLC), a SUPL (Secure User Plane Location) Location Platform (SLP), and/or any other suitable entity that can provide UE 130 with information to aid in the performance of position fixing module 132. Additionally or alternatively, UE 130 can obtain positioning assistance messaging and/or other similar data from a serving base station (e.g., reference cell 120 and/or another suitable network cell).

In one example, location server 110 can include a positioning assistance message generator 112, which can coordinate positioning of respective UEs 130 by generating and communicating positioning assistance messages within system 100. For example, location server 110 can be configured to identify a group of network cells, based on which positioning assistance message generator 112 can be utilized to generate positioning assistance messaging. A group of identified network cells can include, for example, a serving network cell for one or more network users (e.g., UE 130) and one or more neighbor network cells to the serving network cell, a reference cell 120, and/or any other suitable cell(s).

In accordance with one aspect, location server 110 can be configured with data relating to the configuration of a given reference cell 120 and/or respective neighbor cell(s) 122, and positioning assistance message generator 112 can be configured to assemble such data into positioning assistance messaging. As noted above, a reference cell or base station can be a serving base station for one or more given network users (e.g., such as UE 130) or a non-serving base station for the one or more network users. Further, location server 110 can be configured to repeat various operations, such as cell identification, cell information collection, and positioning assistance data generation for a plurality of reference cells 120 within a predefined or predetermined range of location server 110 (e.g., some or all cells in the area of location server 110).

In accordance with one aspect, positioning assistance message generator 112 can be utilized to generate positioning assistance data for a given UE 130 in various manners as described in further detail herein. Upon generation of such data, location server 110 can communicate the generated data to the corresponding UE(s) 130 via one or more positioning assistance messages. In one example, positioning assistance messages generated and communicated by location server 110 can be radio resource control (RRC) messages, messages generated and/or transmitted according to a LTE Positioning Protocol (LPP), and/or messages of any other suitable type.

In one example, positioning assistance messages can be transmitted in a direct manner from location server 110 to UE(s) 130 by, for example, identifying one or more UEs 130 or other network users associated with a reference cell 120 corresponding to the positioning assistance messages and transmitting the positioning assistance messages to the one or more UEs 130 or other network users. Alternatively, positioning assistance messages can be provided to respective UEs 130 in an indirect manner by identifying a network cell that serves one or more UEs 130 or other network users and transmitting the positioning assistance messages to the identified network cell, thereby facilitating forwarding of the positioning assistance messages from the network cell to its served UEs 130 and/or other network users.

Figure 2:
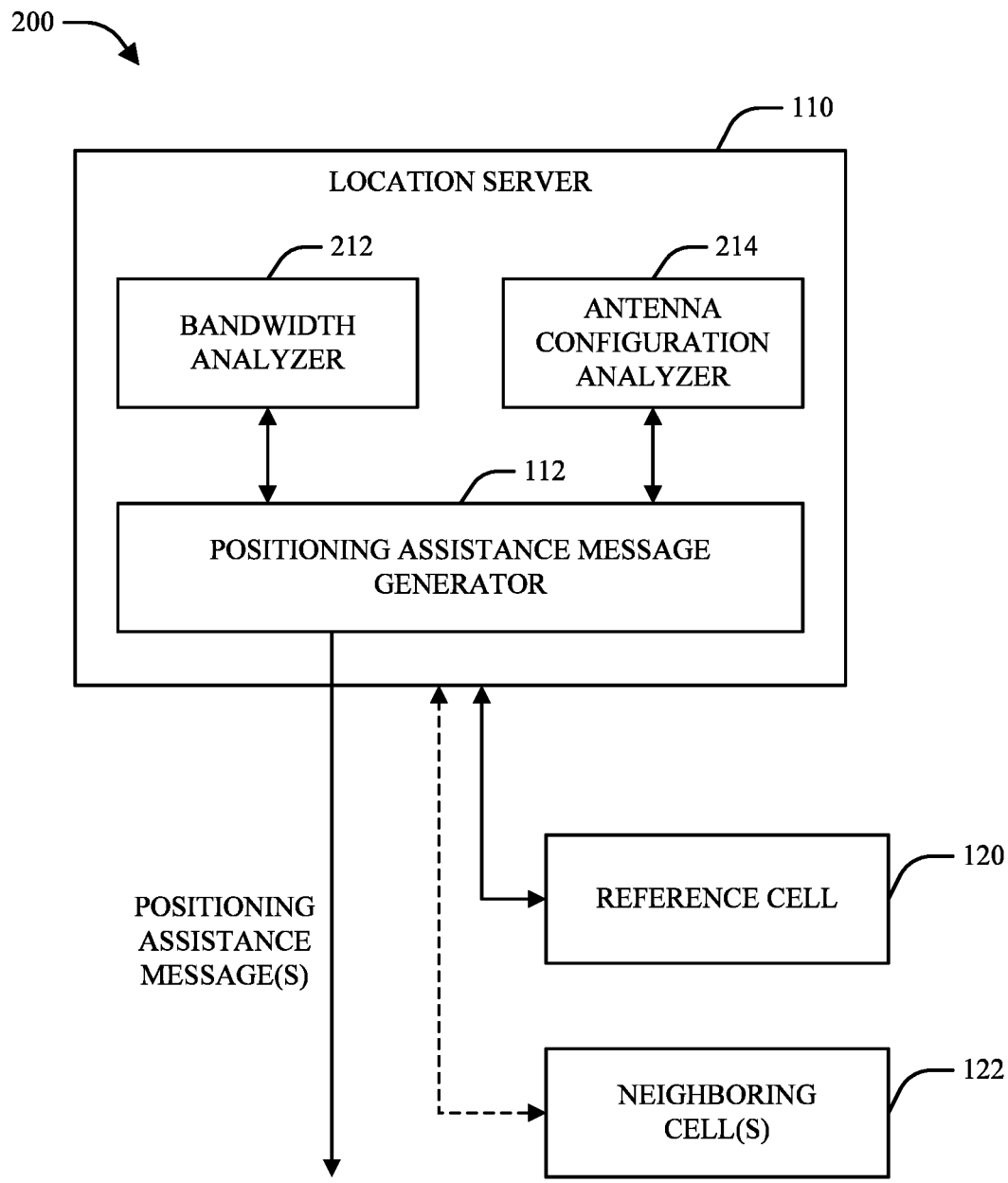
FIG. 2 is a block diagram of a system for generating positioning assistance messaging for one or more mobile devices in accordance with various aspects.

In accordance with another aspect, location server 110 can obtain various elements of information from respective reference cells 120 and/or neighboring cells 122, which can be incorporated into positioning assistance messaging generated by positioning assistance message generator 112 and communicated to respective UEs 130. Information obtained by location server 110 from respective reference cells 120 and/or neighboring cells 122 in this manner can include, for example, bandwidth information, antenna configuration information, and/or other suitable information. The use of such information by location server 110 in generating and communicating positioning assistance data is illustrated in further detail by system 200 in FIG. 2.

In some wireless communication systems (e.g., LTE systems or the like), it can be appreciated that respective network entities can be flexibly configured such that bandwidths utilized by a reference cell 120 (e.g., PRS bandwidth, etc.) can differ from that utilized by respective neighboring cells 122. Additionally or alternatively, it can be appreciated that antenna configurations utilized by a reference cell 120 and/or neighboring cell(s) 122 can differ in some cases (e.g., with respect to a number of employed transmit antennas or the like). For example, respective network cells in system 200 can utilize different numbers of transmit antennas, based on which the respective network cells can transmit different numbers of reference signals to respective users. Thus, it can be appreciated that if a user is not provided with knowledge of a number of transmit antennas (and corresponding reference signals) utilized by a given cell, the user will be required to assume only a single antenna and reference signal is utilized by the cell, thereby nullifying performance increases associated with utilizing multiple antennas. Conversely, by enabling a user to receive reference signals from multiple antennas at a given network cell, performance of the user with respect to cell search, TDOA estimation, and the like can be improved.

In accordance with one aspect, location server 110 can leverage information relating to bandwidth and antenna configurations of respective network cells in system 200 by utilizing a bandwidth analyzer 212 and an antenna configuration analyzer 214, respectively. In one example, based on information collected and/or analyzed by bandwidth analyzer 212 and/or antenna configuration analyzer 214, positioning assistance message generator 112 at location server 110 can generate at least one positioning assistance message that includes information relating to PRS bandwidth, antenna port configurations, or the like, as utilized by reference cell 120 and/or neighboring cell(s) 122. For example, positioning assistance message generator 112 can leverage bandwidth analyzer 212 and/or antenna configuration analyzer 214 to embed information relating to PRS bandwidth and/or an antenna port configuration utilized by a reference cell 120 and/or neighboring cell(s) 122 into at least one positioning assistance message.

In another example, location server 110 can analyze differences between PRS bandwidth, antenna port configurations, or the like, utilized by respective network cells in system 200 and utilize flags and/or other indicators to denote commonalities between properties of respective cells without requiring transmission of the properties for each cell separately.

By way of example, bandwidth analyzer 212 can compare a PRS bandwidth utilized by reference cell 120 to a PRS bandwidth utilized by a neighboring cell 122, based on which positioning assistance message generator 112 can embed an indicator field or flag field corresponding to said comparison within at least one generated positioning assistance message. Such an indicator can be, for example, a 1-bit value that indicates whether the PRS bandwidth utilized by the reference cell 120 is equivalent to or different from the PRS bandwidth utilized by the neighboring cell 122. Thus, upon determining that the PRS bandwidth of the reference cell 120 is different from the PRS bandwidth of the neighboring cell 122, the PRS bandwidth of the neighboring cell 122 can be included in the at least one positioning assistance message. Otherwise, upon determining that the PRS bandwidth of the reference cell 120 is equivalent to the PRS bandwidth of the neighboring cell 122, the PRS bandwidth of the neighboring cell 122 can be omitted from the at least one positioning assistance message. In one example, positioning assistance message generator 112 can embed an indicator of the presence or absence of the PRS bandwidth for the neighboring cell 122 as determined above into at least one corresponding positioning assistance message. Accordingly, it can be appreciated that a location server 110 and/or other suitable entities in system 200 can reduce messaging load associated with positioning assistance data in the event that multiple cells in system 200 share common bandwidth properties.

Similarly, antenna configuration analyzer 214 can compare an antenna port configuration utilized by reference cell 120 to an antenna port configuration utilized by a neighboring cell 122, based on which positioning assistance message generator 112 can embed an indicator of said comparison within at least one generated positioning assistance message. Such an indicator can be, for example, a 1-bit value that indicates whether the antenna port configuration utilized by the reference cell 120 is equivalent to or different from the antenna port configuration utilized by the neighboring cell 122. Thus, upon determining that the antenna port configuration of the reference cell 120 is different from the antenna port configuration of the neighboring cell 122, the antenna port configuration of the neighboring cell 122 can be included in the at least one positioning assistance message. Otherwise, upon determining that the antenna port configuration of the reference cell 120 is equivalent to the antenna port configuration of the neighboring cell 122, the antenna port configuration of the neighboring cell 122 can be omitted from the at least one positioning assistance message. In one example, positioning assistance message generator 112 can embed an indicator of the presence or absence of the antenna port configuration for the neighboring cell 122 as determined above into at least one corresponding positioning assistance message. Accordingly, it can be appreciated that a location server 110 and/or other suitable entities in system 200 can reduce messaging load associated with positioning assistance data in the event that multiple cells in system 200 share common antenna configuration properties.

In view of at least the above, location server 110 can, in accordance with various aspects, generate and/or communicate RRC messages, LPP messages, or the like that carry neighbor cell information as part of positioning assistance data. Such messages can include, for example, fields that indicate the bandwidth and/or number of transmit antennas of a given network cell (e.g., in addition to the usual fields like transmit time differences, etc.). Additionally or alternatively, the message size for such messages can be reduced by utilizing single-bit indications or other such means to identify whether a given neighboring cell 122 has the same bandwidth (or number of transmit antennas) as a reference cell 120.

Figure 3:
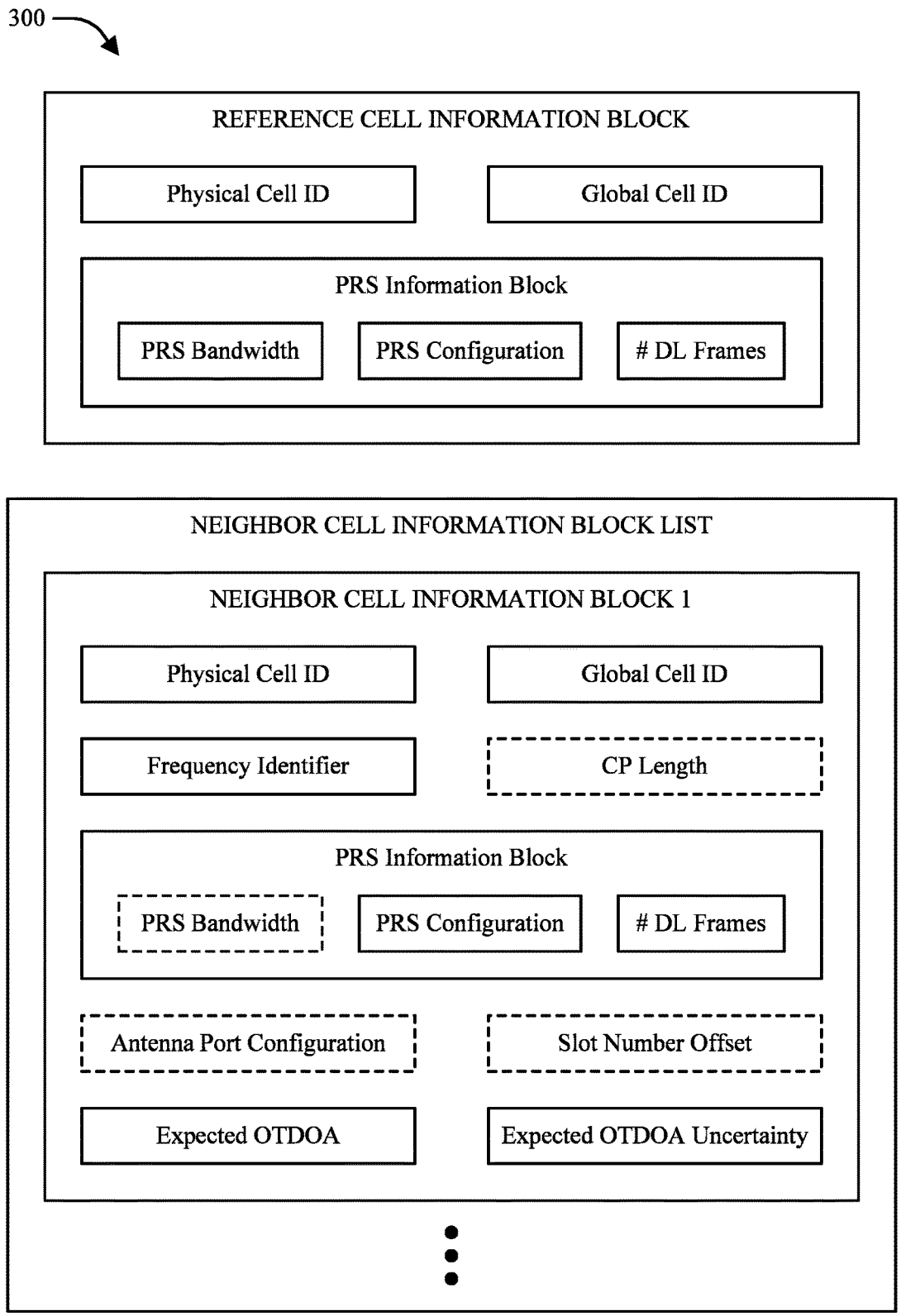
FIG. 3 illustrates an example structure that can be utilized for a positioning assistance message in accordance with various aspects.

In accordance with one aspect, Observed TDOA (OTDOA) assistance data can be provided by location server 110 in the form of respective messages, which in one example can be formatted as shown by diagram 300 in FIG. 3. It should be appreciated, however, that diagram 300 is provided by way of non-limiting example and that, unless explicitly stated otherwise, the hereto appended claims are not intended to be limited to any given implementation(s).

In one example as shown in diagram 300, an OTDOA assistance message can be constructed using a reference cell information block (e.g., corresponding to a reference cell 120) and a list of neighbor cell information blocks (e.g., corresponding to respective neighboring cells 122). A further example of this structure is shown below in Table 1 based on an information element (IE) Downlink-OTDOA-Provide-Assistance-Data, which can be utilized by a location server to provide assistance data to enable UE-assisted downlink OTDOA.

TABLE 1

Example OTDOA assistance data structure.

```
Downlink-OTDOA-Provide-Assistance-Data ::= SEQUENCE {
    otdoaReferenceCellInfo      OTDOAReferenceCellInfo,
    otdoaNeighbourCellInfo      OTDOANeighbourCellInfoList,
    ...
}
```

In accordance with one aspect, a reference cell information block can be utilized by a location server to provide reference cell information for OTDOA assistance data. Based on such information, slot number offsets, expected OTDOAs, and/or other suitable information relating to respective neighbor cells can be provided relative to the cell defined by the reference cell information block. As shown in diagram 300, the reference cell information block can include a physical cell identity (ID) field that specifies the physical cell identity of the reference cell for the assistance data, a global ID field that specifies a globally unique identity of the reference cell (e.g., an E-UTRAN (Evolved UMTS (Universal Mobile Telecommunications System) Radio Access Network) Global Cell Identifier) ECGI or the like), and a PRS information field that specifies a PRS configuration for the reference cell. An example structure for the reference cell information block is shown below in Table 2.

TABLE 2

Example reference cell information block structure.

```
OTDOAReferenceCellInfo ::= SEQUENCE {
    physCellId      INTEGER (0..503),
    cellGlobalId    ECGI                OPTIONAL,
    prsInfo         PRSInfo             OPTIONAL,
    ...
}
```

Further, an example structure for the PRS information block is shown below in Table 3. As shown in Table 3 and diagram 300, the PRS information block can include a PRS bandwidth field that specifies the bandwidth on which PRS is configured, a PRS configuration field that specifies a configuration (e.g., a configuration index) for PRS, and a DL frames field that specifies a number of consecutive DL subframes that are configured for PRS.

TABLE 3

Example PRS information block structure.

```
PRSInfo ::= SEQUENCE {
    prsBandwidth            TBD,
    prsConfigurationIndex   INTEGER (0..4095),
    numDLframes             ENUMERATED { 1sf, 2sf, 4sf, 6sf, ... },
    ...
}
```

In accordance with another aspect, a neighbor cell information block list can be utilized by a location server to provide neighbor cell information for OTDOA assistance data. In one example, the neighbor cell information block list can be generated as a sequence of neighbor cell IEs, which can be sorted according to best measurement geometry at the a priori location estimate of the target device (e.g., in the event that the target device is expected to provide measurements in increasing neighbor cell list order, to the extent that such information is available to the target device).

As shown in diagram 300, a neighbor cell information block can include a physical cell ID, a global ID, and a PRS information block for the corresponding cell in a similar manner to the reference cell information block. Further, a neighbor cell information block can include a frequency identifier field (e.g., in the event that the neighbor cell is not on the target UE's serving frequency), a cyclic prefix (CP) length field that specifies the CP length of the neighbor cell's PRS, an antenna port configuration field that specifies a number of antenna ports that are utilized by the neighbor cell for transmission of cell-specific reference signals, a slot number offset field that specifies the slot number offset between the neighbor cell and the corresponding reference cell, and fields for the expected OTDOA between the neighbor cell and the corresponding reference cell and the uncertainty for the expected OTDOA. An example structure that can be utilized for the neighbor cell information block list, as well as for individual neighbor cell information blocks, is provided by Table 4 below.

TABLE 4

Example neighbor cell information block list and neighbor cell information block structure.

```
OTDOANeighbourCellInfoList ::= SEQUENCE (SIZE (1..64)) OF
OTDOANeighbourCellInfoElement
OTDOANeighbourCellInfoElement ::= SEQUENCE {
    physCellId          INTEGER (0..503),
    cellGlobalId        ECGI                        OPTIONAL,
    earfcn              ARFCN-ValueEUTRA OPTIONAL,
    cpLength            ENUMERATED { normal, extended,
                            ... }                   OPTIONAL,
    prsInfo             PRSInfo                     OPTIONAL,
    antennaPortConfig   ENUMERATED {1-or-2-ports,
                            4-ports, ... }          OPTIONAL,
    slotNumberOffset    INTEGER(0..31)              OPTIONAL,
    expectedOTDOA       TBD
    expectedOTDOAUncertainty  TBD
    ...
}
```

As further shown in Table 4 by optional fields and in diagram 300 by dashed fields, respective fields in a given neighbor cell information block can be omitted under certain circumstances. For example, in the event that information corresponding to a neighbor cell is substantially similar to corresponding information for a reference cell (e.g., with respect to cyclic prefix length, PRS bandwidth, antenna port configuration, slot timing, etc.), such information can be omitted from the neighbor cell information block. In one example, flags and/or other indicators of the presence or absence of one or more fields in a neighbor cell information block can be provided within positioning assistance messaging provided to one or more mobile users. In such an example, flags for given fields relative to a neighboring cell can additionally serve as indicators relating to whether corresponding parameters of the neighboring cell match those of a reference cell.

Figure 4:
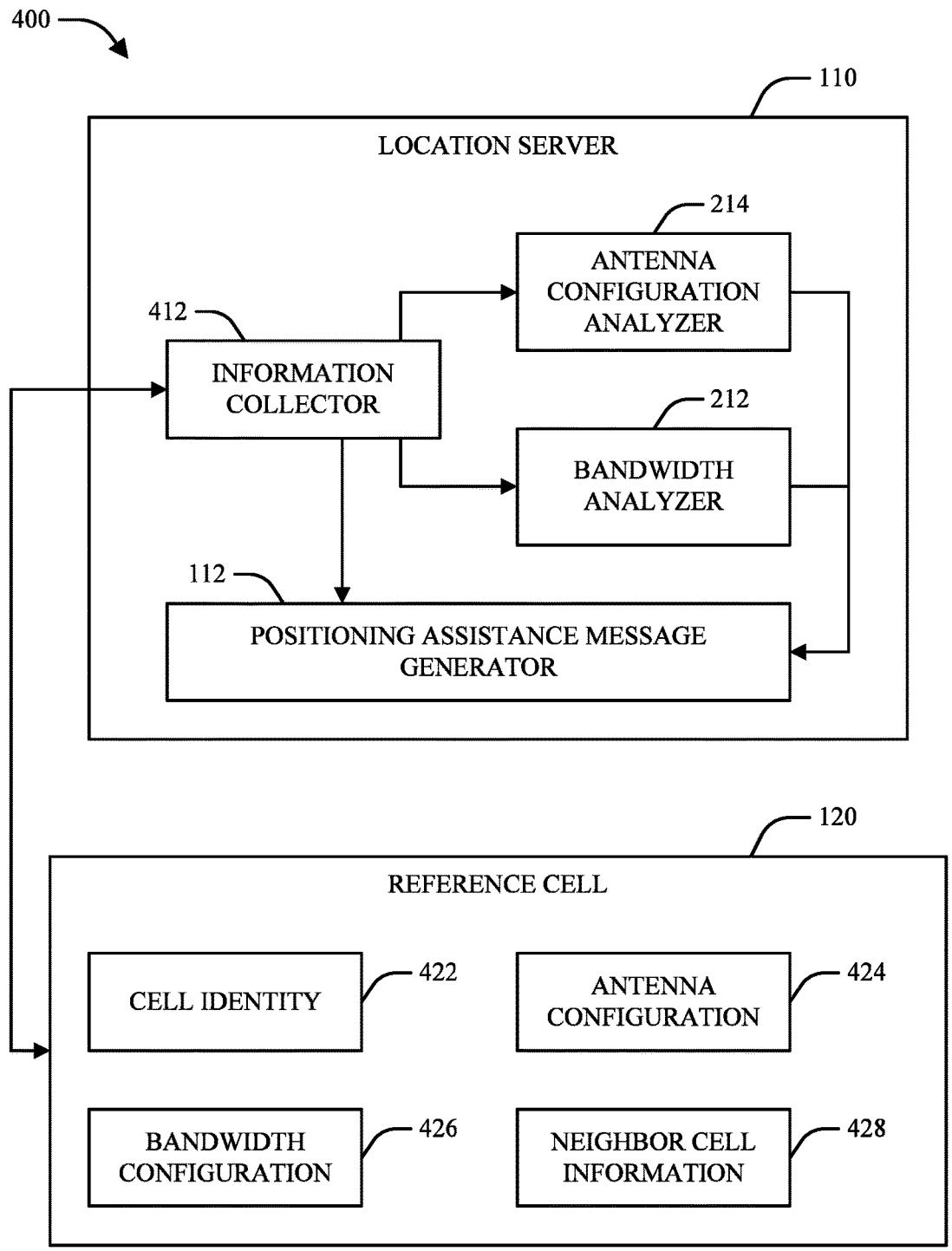
FIG. 4 is a block diagram of a system for obtaining and utilizing network cell information in connection with generating assistance messaging for positioning in accordance with various aspects.

Turning next to FIG. 4, a block diagram of a system 400 for obtaining and utilizing network cell information in connection with generating assistance messaging for positioning in accordance with various aspects is illustrated. As shown by system 400, a location server 110 (e.g., a SMLC or E-SMLC, a SLP, etc.) can communicate with a reference cell 120 to facilitate generation and transmission of positioning assistance signaling to one or more users. In accordance with one aspect, location server 110 can obtain information from reference cell 120 via an information collector 412 or other means, which can be utilized by a positioning assistance message generator 112 (e.g., with or without the aid of a bandwidth analyzer 212 and/or an antenna configuration analyzer 214) to generate positioning assistance messages.

In one example, a reference cell 120 and/or other suitable network cell can obtain at least one positioning assistance message from a location server 110 and subsequently forward the at least one positioning assistance message to one or more served users. Additionally or alternatively, reference cell 120 can receive a prompt for cell information (e.g., a cell identity 422, antenna configuration 424, and/or bandwidth configuration 426 relating to reference cell 120; neighbor cell information 428 relating to neighboring cells to a serving network cell; etc.) from location server 110, in response to which reference cell 120 can convey cell information to the location server 110. In general, information provided by reference cell 120 in response to a prompt by location server 110 can include cell identifiers, position information, a utilized PRS bandwidth or antenna port configuration, information relating to one or more neighboring network cells, or the like.

Figure 5:
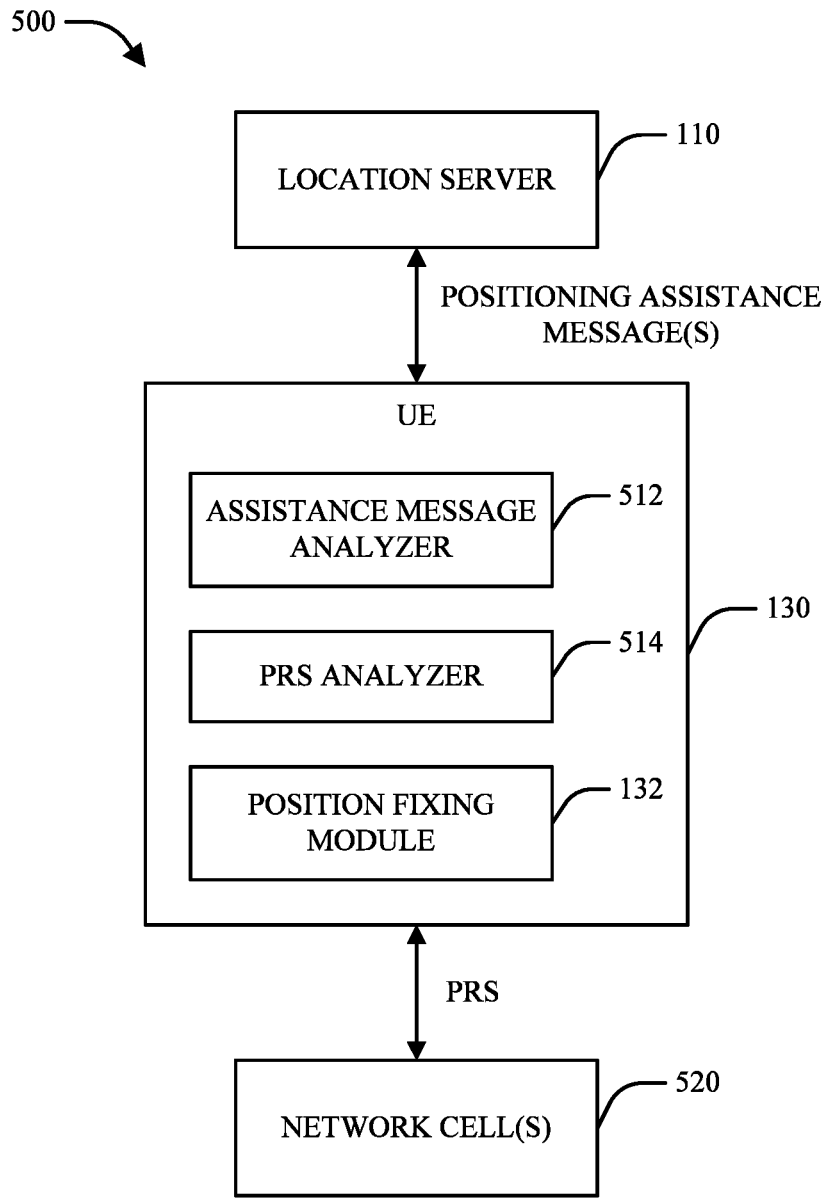
FIG. 5 is a block diagram of a system that facilitates position fixing based on positioning assistance data in accordance with various aspects.

Referring now to FIG. 5, a system 500 that facilitates position fixing based on positioning assistance data in accordance with various aspects is illustrated. As shown by system 500, a UE 130 can perform position fixing within system 500 in order to estimate its current location at least in part by computing a time difference of arrival between respective reference signals (e.g., PRS) transmitted by respective network cells 520 (e.g., serving or non-serving reference cells, neighboring cells, etc.). Further, UE 130 can utilize positioning assistance message(s) transmitted by a location server 110 and/or another suitable entity within system 500 (e.g., a network cell 520) to facilitate improved, lower complexity positioning. As further shown in system 500, a UE 130 can utilize an assistance message analyzer 512 to identify information contained within one or more positioning assistance messages, based on which a PRS analyzer 514 can be utilized in combination with, or independently of, a position fixing module 132 to determine the location of UE 130.

In accordance with one aspect, assistance message analyzer 512 at UE 130 can identify an indicator field within a positioning assistance message that indicates whether a PRS bandwidth utilized by a reference base station (e.g., associated with network cells 520) matches a PRS bandwidth utilized by respective non-reference base stations. Additionally or alternatively, an indicator field within a positioning assistance message can indicate whether an antenna port configuration utilized by the reference base station matches an antenna port configuration utilized by respective non-reference base stations. Upon such analysis, UE 130 can be configured to receive supplemental information relating to PRS bandwidth and/or antenna port configurations utilized by non-reference base stations that are indicated as utilizing a different PRS bandwidth or antenna port configuration from the reference base station. In one example, indicator fields used in this manner can be 1-bit indicators and/or any other suitable indicator(s). Subsequently, based on at least one of a positioning assistance message or received supplemental information, position fixing module 132 can conduct position fixing for UE 130.

Figure 6:
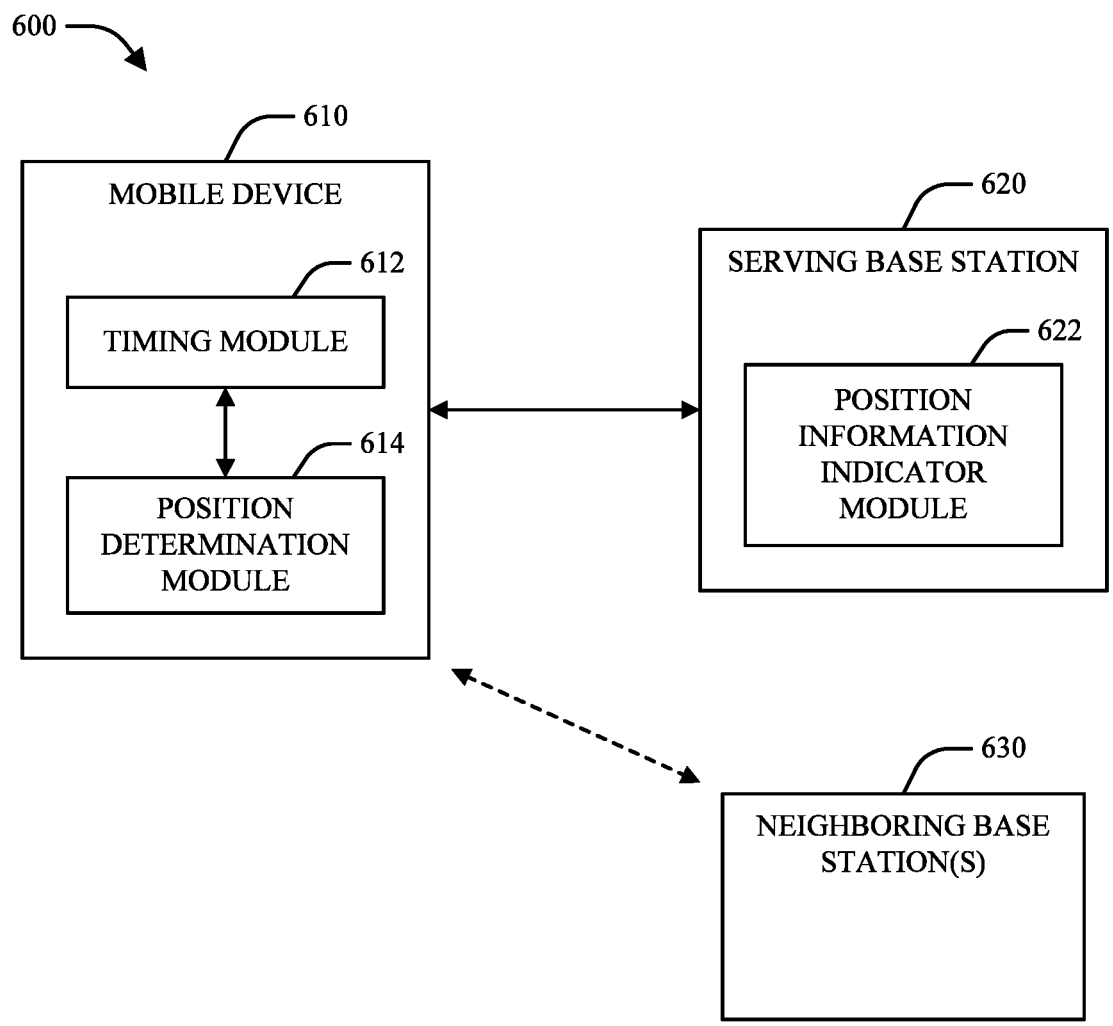
FIG. 6 is a block diagram of a system for low complexity mobile device positioning in a wireless communication system in accordance with various aspects.

Turning now to FIG. 6, a block diagram of a system 600 for low complexity mobile device positioning in a wireless communication system is illustrated. System 600 can include one or more mobile devices 610, which can communicate with one or more serving base stations 620 on an uplink and/or downlink. Further, one or more neighboring base stations 630 that are not serving base stations for mobile device 610 can be present in system 600.

In accordance with an aspect, mobile device 610 and/or other suitable entities in system 600 can fix the position of mobile device 610 using various techniques. For example, mobile device 610 can utilize a triangulation method based on timing measurements made (e.g., by a timing module 612) on reference signals or pilot signals transmitted by respective base stations 620-630. Thus, for example, mobile device 610 can receive respective reference signals from serving base station 620 and/or neighboring base station(s) 630 and measure the time difference (e.g., the TDOA) between the respective base stations 620 and/or 630 via timing module 612. Based on these timing measurements, a position determination module 614 can fix or determine the location of mobile device 610.

As a specific example of the above, two base stations 620 and/or 630 can transmit reference signals to mobile device 610, which can arrive at different times at mobile device 610. Accordingly, mobile device 610 can search for these reference signals and, upon detecting the signals, determine their TDOA. Based on the measured TDOA (and knowledge of the locations of the base stations 620 and/or 630 from which the reference signals were received), position determination module 614 can determine a candidate region corresponding to a hyperbola on which mobile device 610 can be located. Subsequently, by performing multiple measurements and determinations in this manner (e.g., with different pairs of base stations 620 and/or 630), it can be appreciated that mobile device 610 can fix its location by identifying a point of intersection between the respective candidate hyperbolas.

It can be appreciated that, in order to perform positioning in the above manner and/or other suitable manners, mobile device 610 can require various assistance data from entities within system 600. This assistance data can include information such as the location of the nearest neighboring base stations 630 and/or serving base station 620, relative transmit time differences between different base stations 620 and/or 630, cell IDs of respective base stations 620 and/or 630 (e.g., in the event that reference signals transmitted by a given base station are a function of a cell ID of the base station), or the like. Such information can be utilized by mobile device 610 to, for example, enable position fixing, reduce measurement complexity, and/or improve positioning performance. In an aspect, positioning assistance data can be obtained by mobile device 610 via broadcast messaging and/or other suitable messaging from serving base station 620 (e.g., via a position information indicator module 622 or the like).

In accordance with an aspect, the complexity of TDOA measurements performed by mobile device 610 can vary depending on the amount of assistance data made available to mobile device 610 by serving base station 620 and/or other entities in system 600. Further, in some wireless communication environments (e.g., LTE, etc.), mobile device 610 can in some cases be required to obtain additional information in order to efficiently perform positioning.

As a first example, it in some cases could be desirable for mobile device 610 to obtain information relating to the number of transmit antennas at a given base station. In an aspect, the number of transmit antennas can in some cases differ between base stations, based on which a plurality of reference signals may be available to mobile device 610. However, if mobile device 610 does not have information relating to the number of transmit antennas available at a given base station, mobile device 610 may search only for a single transmit antenna per base station. This can, in turn, cause mobile device 610 to miss various reference signals transmitted by respective cells and/or cause an adverse effect on the performance of positioning at mobile device 610 in other manners. Similarly, in a network implementation where bandwidth can vary on a per-cell basis, it can be appreciated that mobile device 610 can in some cases be required to obtain information relating to the bandwidth utilized by a given base station in order to successfully detect reference signals transmitted by the base station.

Accordingly, to facilitate enhanced, reduced complexity positioning at mobile device 610 in a network environment that can utilize variable bandwidths and/or transmit antennas in the above manner, position information indicator module 622 and/or other suitable means associated with serving base station 620 or system 600 in general can provide information relating to bandwidth and/or transmit antennas of respective base stations 620 and/or 630 with messages that carry neighbor cell information as part of positioning assistance data.

In one example, positioning assistance messages provided to mobile device 610 can include fields that indicate the bandwidth and/or number of transmit antennas of a given neighboring base station 630. Additionally or alternatively, such messages can include information relating to base station location, transmit time differences between respective base stations (e.g., time offsets between reference signal transmissions of respective non-synchronized base stations), or the like.

In accordance with another aspect, the size of the above positioning assistance messages can be reduced by utilizing field(s) that indicate whether a given neighboring base station 630 has the same bandwidth and/or the same number of transmit antennas as serving base station 620 (or another suitable reference base station). Accordingly, upon a neighboring base station 630 having the same bandwidth and/or number of transmit antennas as serving base station 620 and/or another suitable base station, an abbreviated indicator field (e.g., respective 1-bit indicators for bandwidth and/or transmit antennas) can be transmitted to mobile device 610 in place of providing full information for each base station 620-630.

Referring now to FIGS. 7-10, methodologies that can be performed in accordance with various aspects set forth herein are illustrated. While, for purposes of simplicity of explanation, the methodologies are shown and described as a series of acts, it is to be understood and appreciated that the methodologies are not limited by the order of acts, as some acts can, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Figure 7:
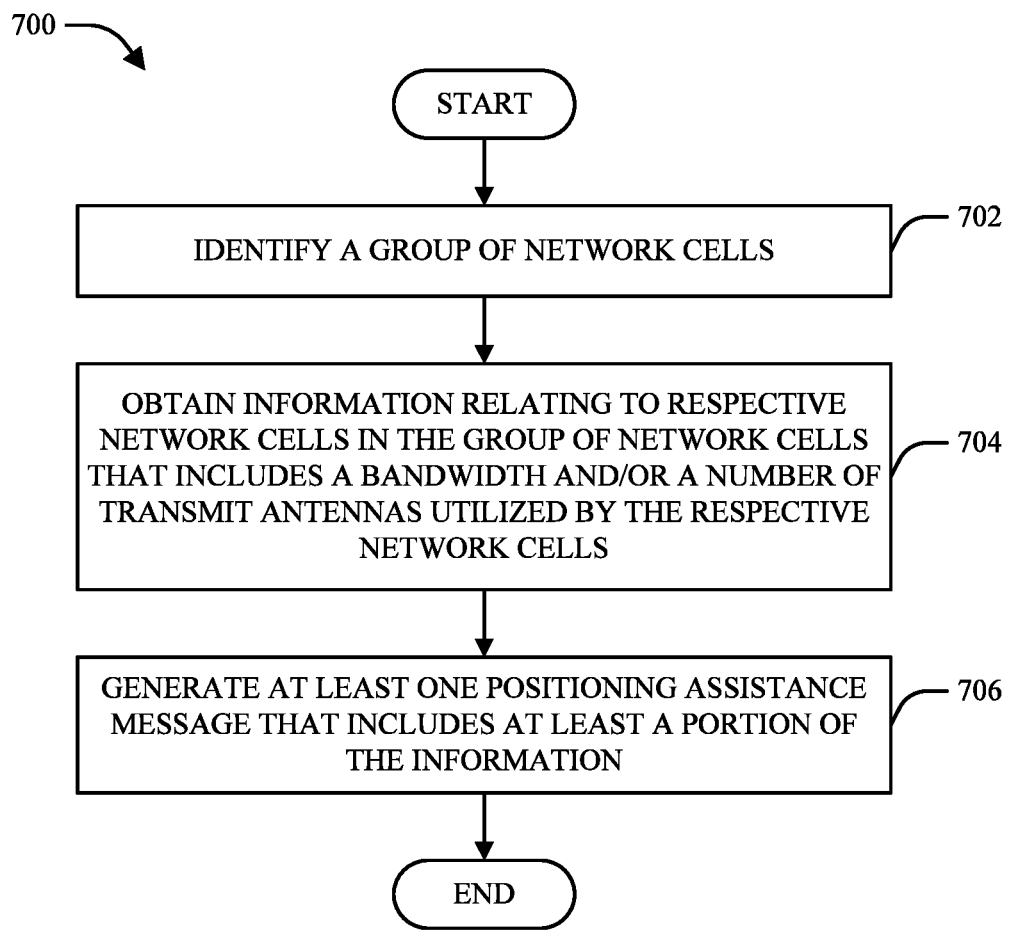
FIGS. 7-10 are flow diagrams of respective methodologies for network-assisted positioning in a wireless communication system.

With reference to FIG. 7, illustrated is a methodology 700 for network-assisted positioning in a wireless communication system. It is to be appreciated that methodology 700 can be performed by, for example, a positioning coordinator (e.g., location server 110) and/or any other appropriate network entity. Methodology 700 begins at block 702, wherein a group of network cells (e.g., a reference cell 120 and/or one or more neighboring cells 122) is identified. Next, at block 704, information is obtained relating to respective network cells in the group of network cells identified at block 702. Such information can include, for example, a bandwidth and/or a number of transmit antennas utilized by the respective network cells. Methodology 700 can then conclude at block 706, wherein at least one positioning assistance message is generated (e.g., by a positioning assistance message generator 112) that includes at least a portion of the information generated at block 704.

Figure 8:
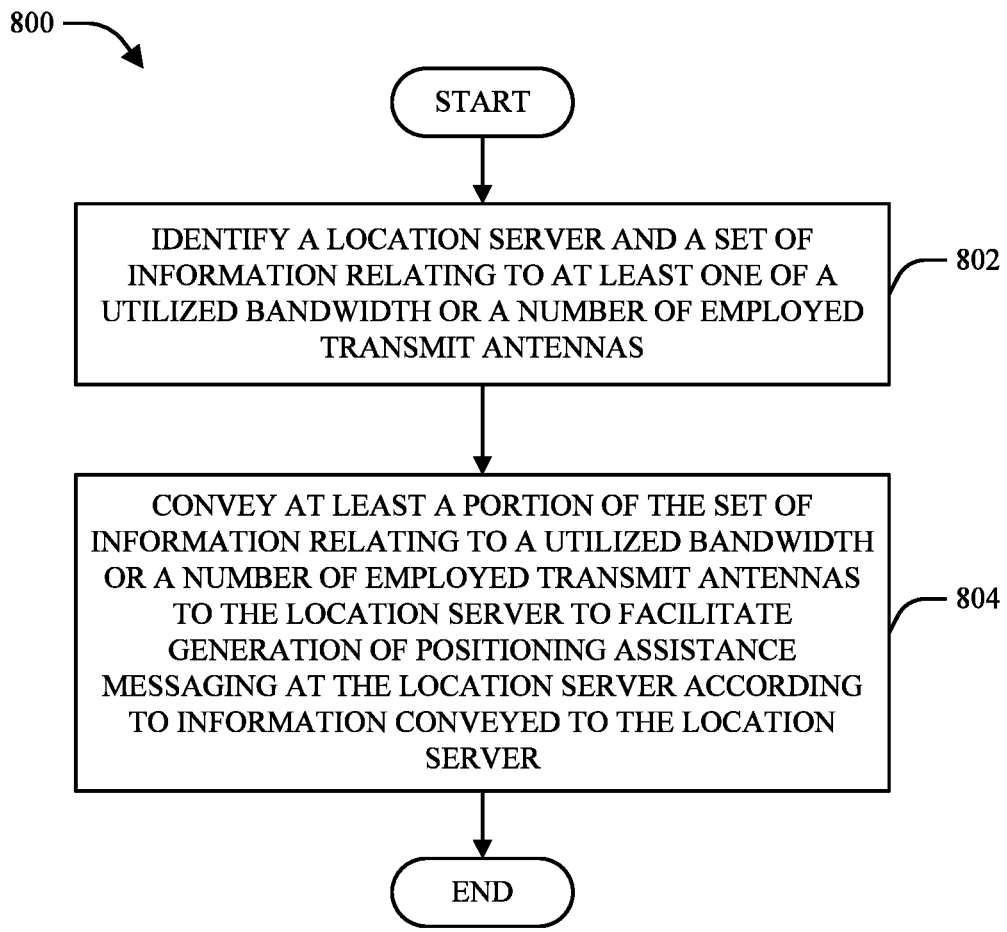

Turning now to FIG. 8, a flow diagram of another methodology 800 for network-assisted positioning in a wireless communication system is illustrated. Methodology 800 can be performed by a base station (e.g., reference cell 120) and/or any other appropriate network entity. Methodology 800 begins at block 802, wherein a location server (e.g., location server 110) and a set of information relating to at least one of a bandwidth or a number of employed transmit antennas utilized by an entity performing methodology 800 is identified. Methodology 800 can then conclude at block 804, wherein at least a portion of the set of information identified at block 802 is conveyed to the location server identified at block 802 in order to facilitate generation of positioning assistance messaging at the location server according to the conveyed information.

Figure 9:
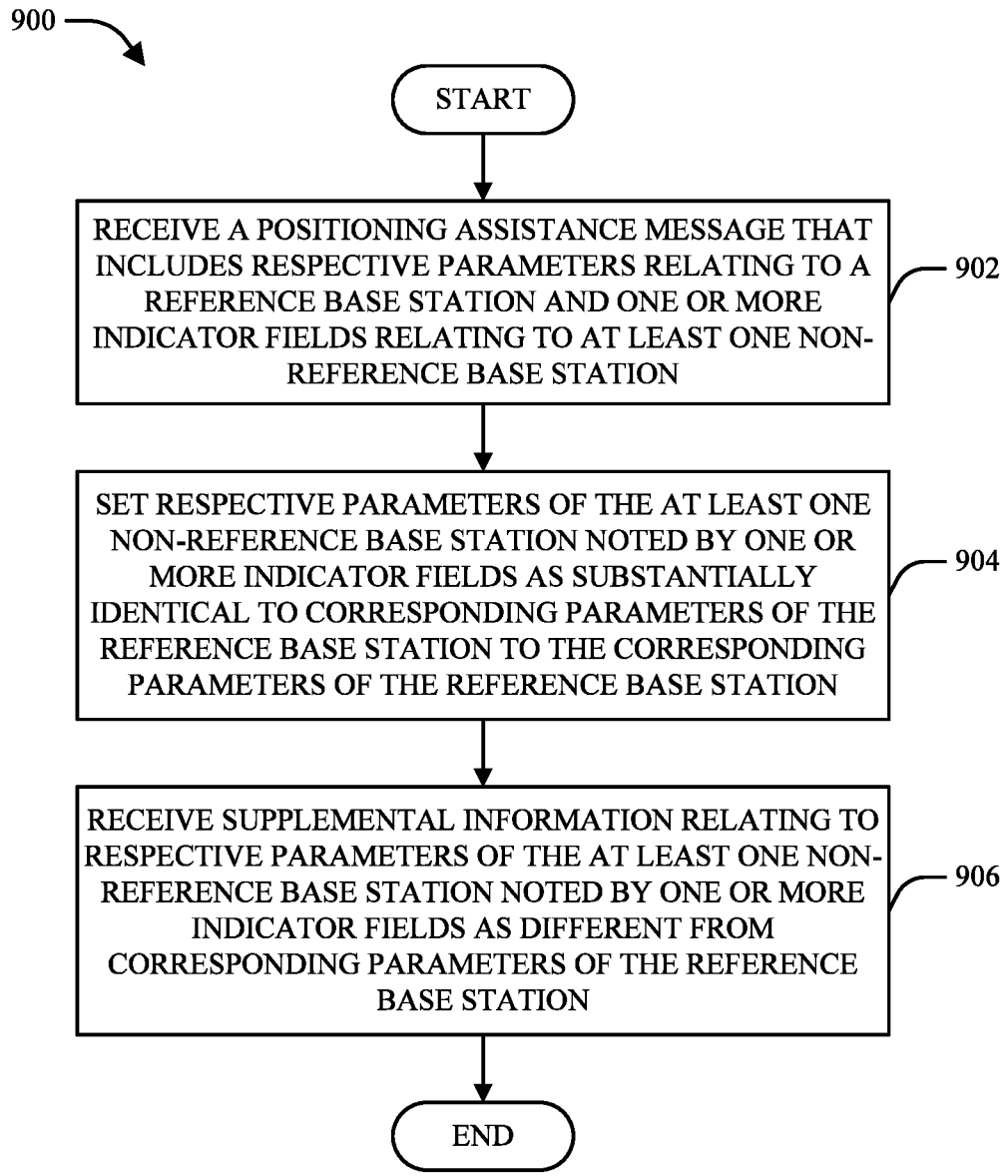

FIG. 9 illustrates a third methodology 900 for network-assisted positioning in a wireless communication system. Methodology 900 can be performed by, for example, a mobile device (e.g., UE 130) and/or any other suitable network entity. Methodology 900 begins at block 902, wherein a positioning assistance message is received (e.g., from a location server 110, and/or a network cell 520) that includes respective parameters relating to a reference base station and one or more indicator fields relating to at least one non-reference base station. Next, at block 904, respective parameters of the at least one non-reference base station noted by one or more indicator fields (e.g., in the positioning assistance message received at block 902) as substantially identical to corresponding parameters of the reference base station are set to the corresponding parameters of the reference base station. Additionally or alternatively, at block 906, supplemental information is received that relates to respective parameters of the at least one non-reference base station noted by one or more indicator fields (e.g., in the positioning assistance message received at block 902) as different from corresponding parameters of the reference base station.

Figure 10:
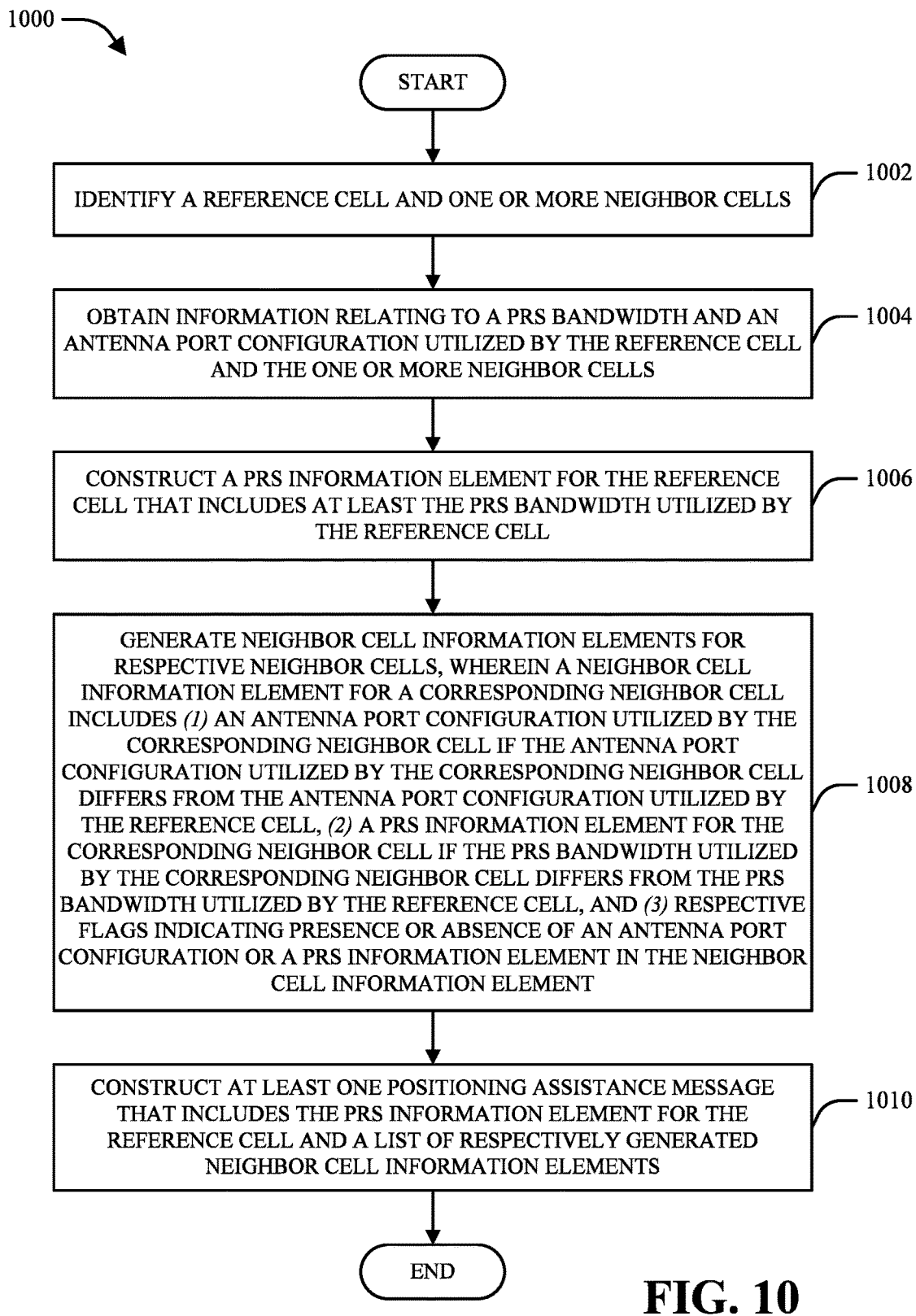

Referring now to FIG. 10, a further methodology 1000 for network-assisted positioning in a wireless communication system is illustrated. Methodology 1000 can be performed by, for example, a location server (e.g., location server 110), a Node B (e.g., reference cell 120 and/or a neighboring cell 122), and/or any other appropriate network entity. Methodology 1000 begins at block 1002, wherein a reference cell and one or more neighbor cells are identified. Next, at block 1004, information is obtained that relates to a PRS bandwidth and an antenna port configuration utilized by the reference cell and the one or more neighbor cells.

Upon completing the acts described at block 1004, methodology 1000 can proceed to block 1006, wherein a PRS information element is constructed for the reference cell identified at block 1002 that includes at least the PRS bandwidth utilized by the reference cell as ascertained at block 1004. Further, at block 1008, neighbor cell information elements are generated for respective neighbor cells identified at block 1002. As shown at block 1008, a neighbor cell information element for a corresponding neighbor cell can includes an antenna port configuration utilized by the corresponding neighbor cell if the antenna port configuration utilized by the corresponding neighbor cell differs from the antenna port configuration utilized by the reference cell, a PRS information element for the corresponding neighbor cell if the PRS bandwidth utilized by the corresponding neighbor cell differs from the PRS bandwidth utilized by the reference cell, and respective flags indicating presence or absence of an antenna port configuration or a PRS information element in the neighbor cell information element. Methodology 1000 can then conclude at block 1010, wherein at least one positioning assistance message is constructed that includes the PRS information element for the reference cell as constructed at block 1006 and a list of respectively generated neighbor cell information elements as described at block 1008 (e.g., in a format similar to that illustrated by diagram 300).

Figure 11:
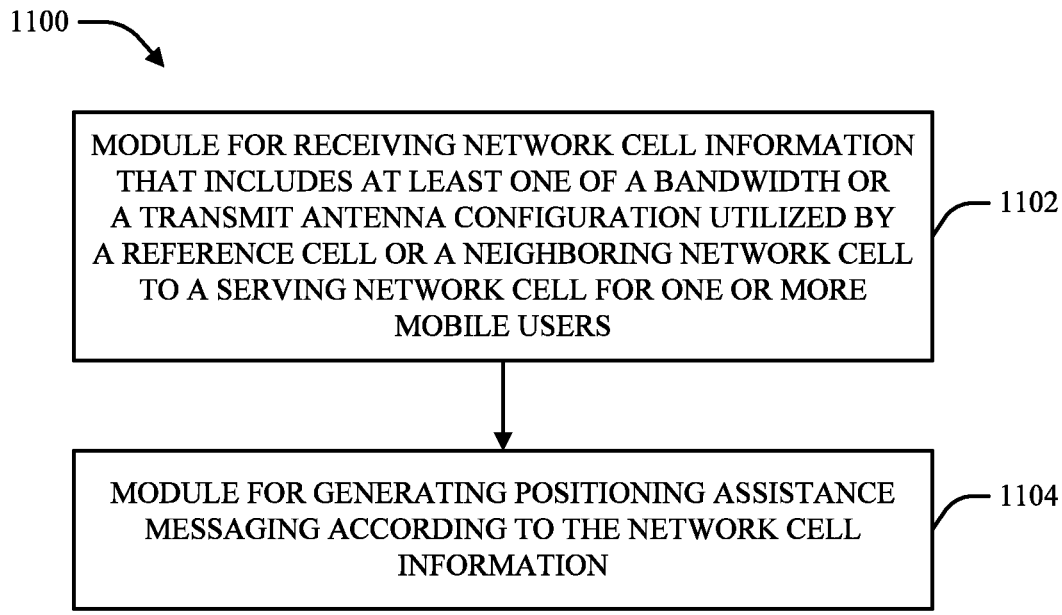
FIGS. 11-13 are block diagrams of respective apparatuses that facilitate low complexity position fixing in a wireless communication system.
Figure 12:
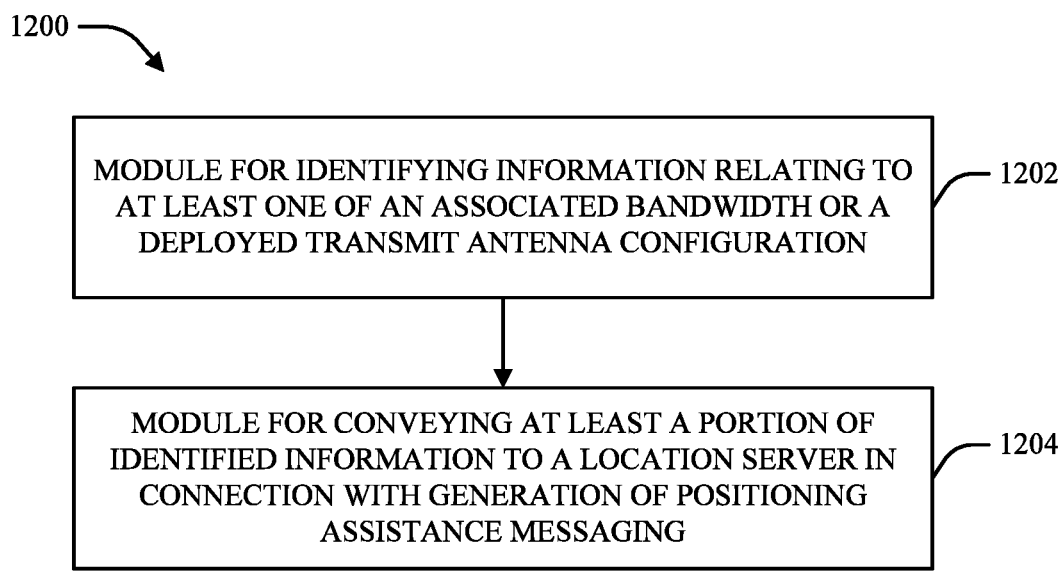
Figure 13:
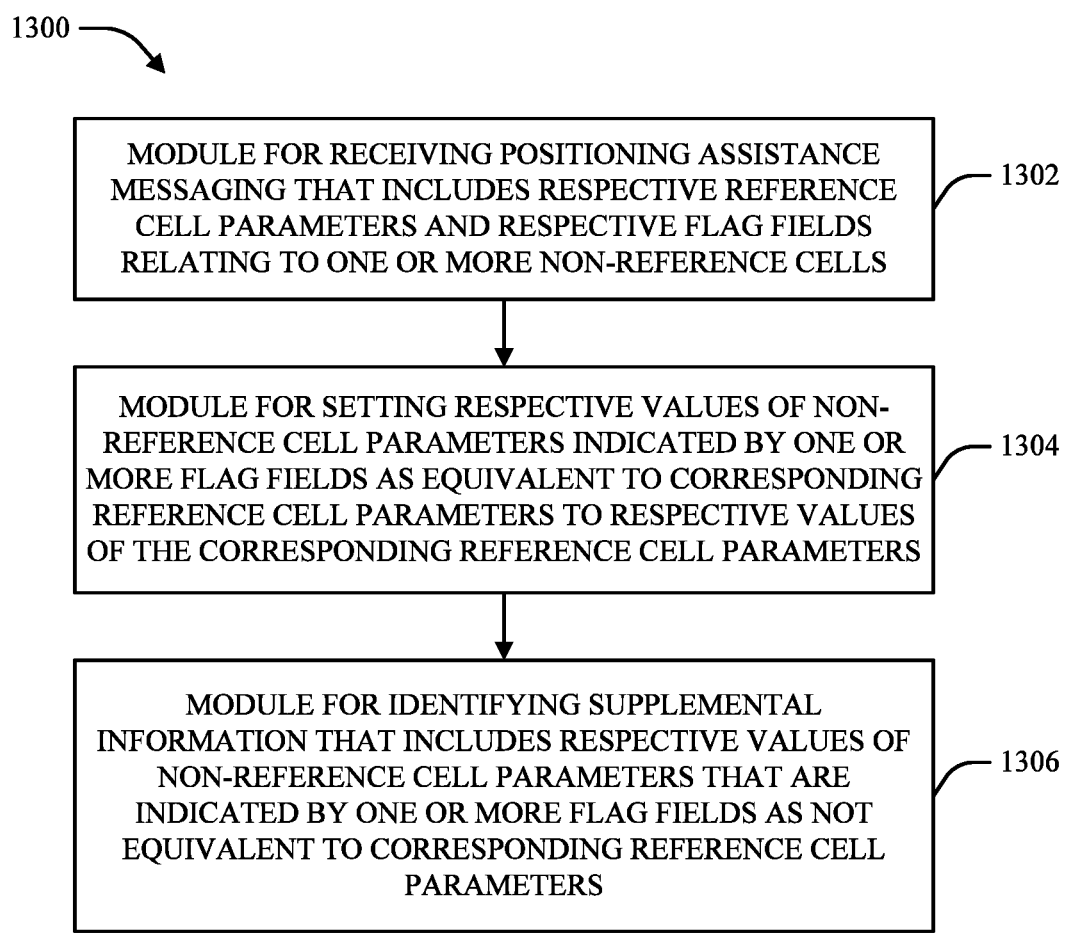

Referring next to FIGS. 11-13, illustrated are respective apparatuses 1100-1300 that can be utilized to implement various aspects described herein. It is to be appreciated that apparatuses 1100-1300 are represented as including functional blocks, which can be functional blocks that represent functions implemented by a processor, software, or combination thereof (e.g., firmware).

Turning first to FIG. 11, an apparatus 1100 that facilitates low complexity position fixing in a wireless communication system is illustrated. Apparatus 1100 can be implemented by a location manager (e.g., location server 110) and/or any other suitable network entity and can include a module 1102 for receiving network cell information that includes at least one of a bandwidth or a transmit antenna configuration utilized by a reference cell or a neighboring network cell to a serving network cell for one or more mobile users and a module 1104 for generating positioning assistance messaging according to the network cell information.

Referring next to FIG. 12, a second apparatus 1200 that facilitates low complexity position fixing in a wireless communication system is illustrated. Apparatus 1200 can be implemented by a network cell (e.g., reference cell 120 or a neighboring cell 122) and/or any other suitable network entity and can include a module 1202 for identifying information relating to at least one of an associated bandwidth or a deployed transmit antenna configuration and a module 1204 for conveying at least a portion of identified information to a location server in connection with generation of positioning assistance messaging.

FIG. 13 illustrates a third apparatus 1300 that facilitates low complexity position fixing in a wireless communication system. Apparatus 1300 can be implemented by a UE (e.g., UE 130) and/or any other suitable network entity and can include a module 1302 for receiving positioning assistance messaging that includes respective reference cell parameters and respective flag fields relating to one or more non-reference cells, a module 1304 for setting respective values of non-reference cell parameters indicated by one or more flag fields as equivalent to corresponding reference cell parameters to respective values of the corresponding reference cell parameters, and a module 1306 for identifying supplemental information that includes respective values of non-reference cell parameters that are indicated by one or more flag fields as not equivalent to corresponding reference cell parameters.

Figure 14:
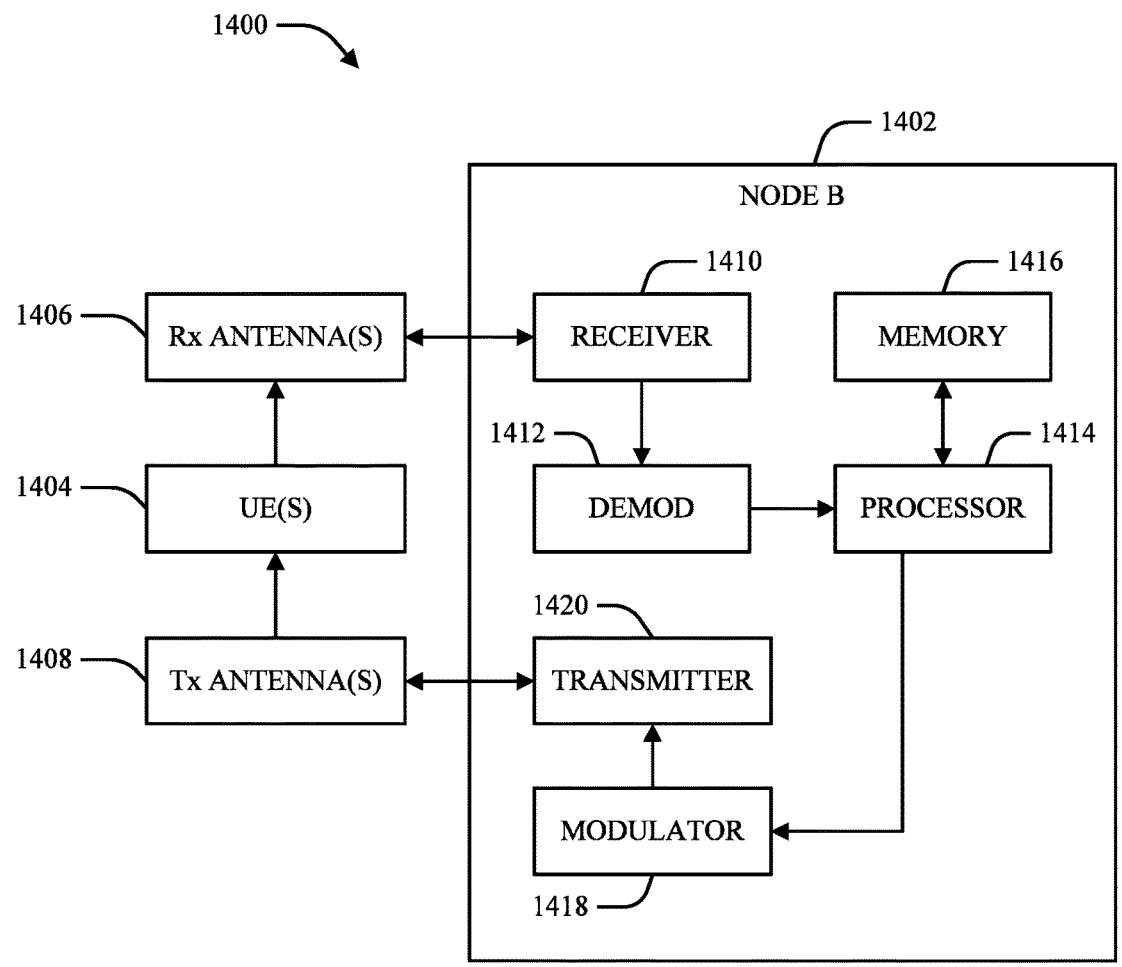
FIGS. 14-15 are block diagrams of respective wireless communication devices that can be utilized to implement various aspects described herein.

FIG. 14 is a block diagram of a system 1400 that can be utilized to implement various aspects of the functionality described herein. In one example, system 1400 includes a base station or Node B 1402. As illustrated, Node B 1402 can receive signal(s) from one or more UEs 1404 via one or more receive (Rx) antennas 1406 and transmit to the one or more UEs 1404 via one or more transmit (Tx) antennas 1408. Additionally, Node B 1402 can comprise a receiver 1410 that receives information from receive antenna(s) 1406. In one example, the receiver 1410 can be operatively associated with a demodulator (Demod) 1412 that demodulates received information. Demodulated symbols can then be analyzed by a processor 1414. Processor 1414 can be coupled to memory 1416, which can store information related to code clusters, access terminal assignments, lookup tables related thereto, unique scrambling sequences, and/or other suitable types of information. Additionally, Node B 1402 can employ processor 1414 to perform methodologies 800, 1000, and/or other similar and appropriate methodologies. In one example, Node B 1402 can also include a modulator 1418 that can multiplex a signal for transmission by a transmitter 1420 through transmit antenna(s) 1408.

Figure 15:
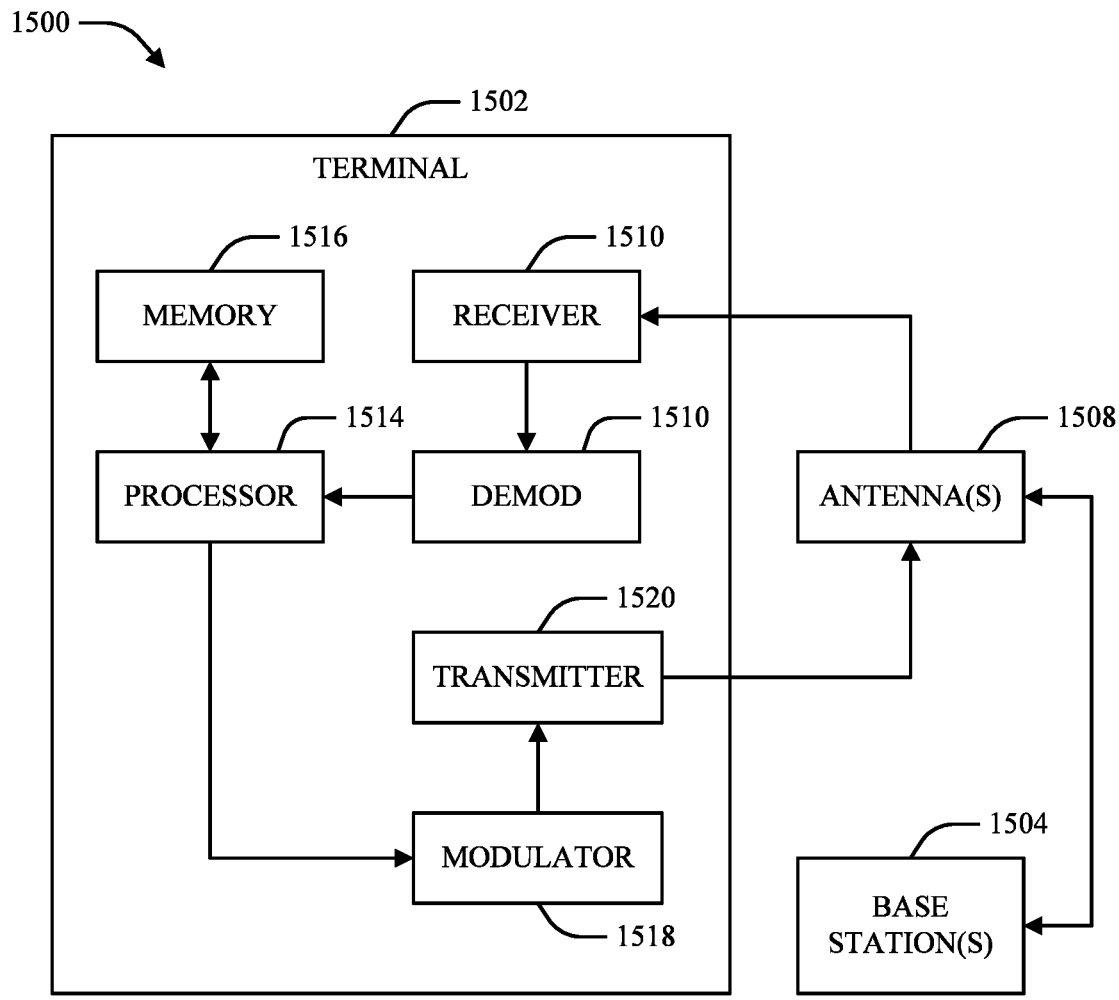

FIG. 15 is a block diagram of another system 1500 that can be utilized to implement various aspects of the functionality described herein. In one example, system 1500 includes a mobile terminal 1502. As illustrated, mobile terminal 1502 can receive signal(s) from one or more base stations 1504 and transmit to the one or more base stations 1504 via one or more antennas 1508. Additionally, mobile terminal 1502 can comprise a receiver 1510 that receives information from antenna(s) 1508. In one example, receiver 1510 can be operatively associated with a demodulator (Demod) 1512 that demodulates received information. Demodulated symbols can then be analyzed by a processor 1514. Processor 1514 can be coupled to memory 1516, which can store data and/or program codes related to mobile terminal 1502. Additionally, mobile terminal 1502 can employ processor 1514 to perform methodologies 900 and/or other similar and appropriate methodologies. Mobile terminal 1502 can also include a modulator 1518 that can multiplex a signal for transmission by a transmitter 1520 through antenna(s) 1508.

Figure 16:
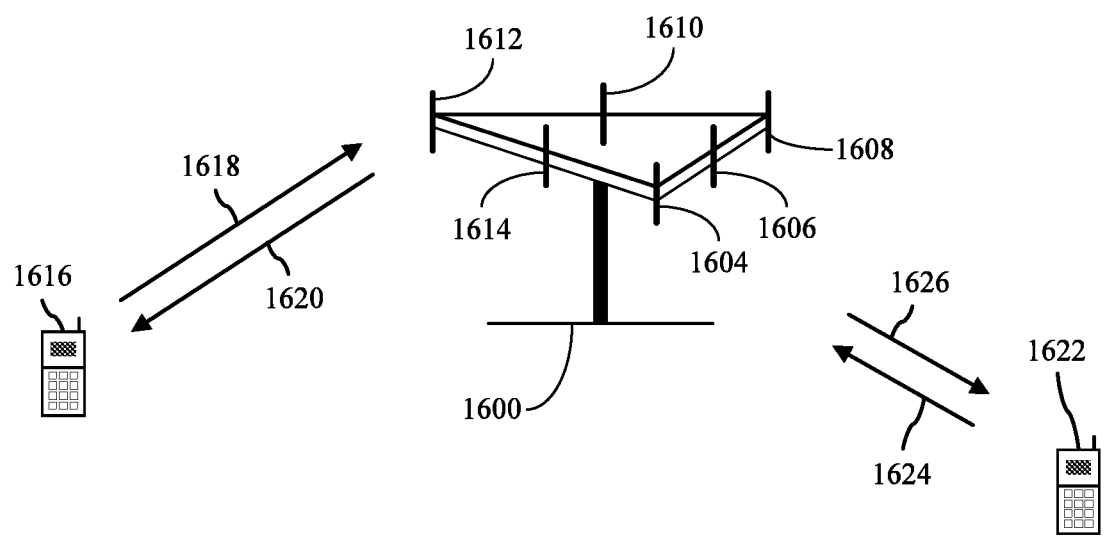
FIG. 16 illustrates a wireless multiple-access communication system in accordance with various aspects set forth herein.

Referring now to FIG. 16, an illustration of a wireless multiple-access communication system is provided in accordance with various aspects. In one example, an access point 1600 (AP) includes multiple antenna groups. As illustrated in FIG. 16, one antenna group can include antennas 1604 and 1606, another can include antennas 1608 and 1610, and another can include antennas 1612 and 1614. While only two antennas are shown in FIG. 16 for each antenna group, it should be appreciated that more or fewer antennas may be utilized for each antenna group. In another example, an access terminal 1616 can be in communication with antennas 1612 and 1614, where antennas 1612 and 1614 transmit information to access terminal 1616 over forward link 1620 and receive information from access terminal 1616 over reverse link 1618. Additionally and/or alternatively, access terminal 1622 can be in communication with antennas 1606 and 1608, where antennas 1606 and 1608 transmit information to access terminal 1622 over forward link 1626 and receive information from access terminal 1622 over reverse link 1624. In a frequency division duplex system, communication links 1618, 1620, 1624 and 1626 can use different frequency for communication. For example, forward link 1620 may use a different frequency then that used by reverse link 1618.

Each group of antennas and/or the area in which they are designed to communicate can be referred to as a sector of the access point. In accordance with one aspect, antenna groups can be designed to communicate to access terminals in a sector of areas covered by access point 1600. In communication over forward links 1620 and 1626, the transmitting antennas of access point 1600 can utilize beamforming in order to improve the signal-to-noise ratio of forward links for the different access terminals 1616 and 1622. Also, an access point using beamforming to transmit to access terminals scattered randomly through its coverage causes less interference to access terminals in neighboring cells than an access point transmitting through a single antenna to all its access terminals.

An access point, e.g., access point 1600, can be a fixed station used for communicating with terminals and can also be referred to as a base station, an eNB, an access network, and/or other suitable terminology. In addition, an access terminal, e.g., an access terminal 1616 or 1622, can also be referred to as a mobile terminal, user equipment, a wireless communication device, a terminal, a wireless terminal, and/or other appropriate terminology.

Figure 17:
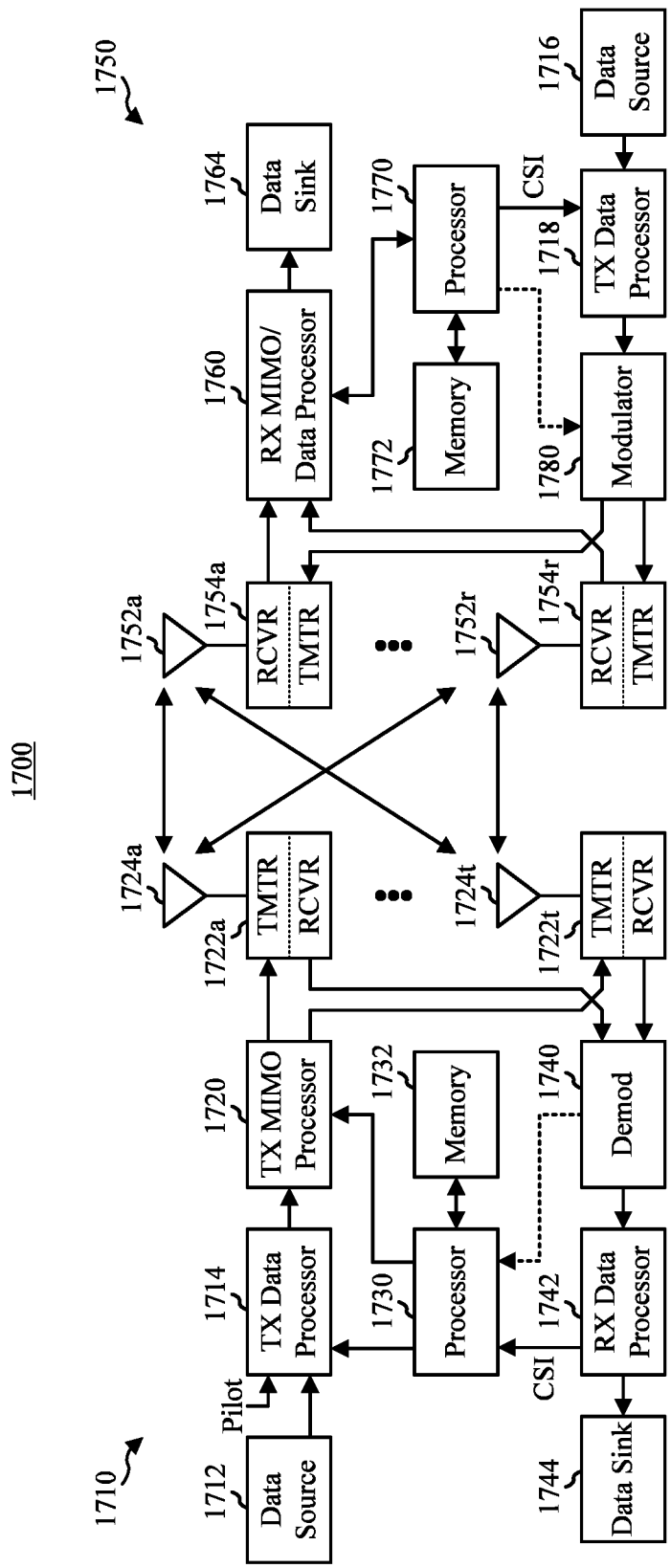
FIG. 17 is a block diagram illustrating an example wireless communication system in which various aspects described herein can function.

Referring now to FIG. 17, a block diagram illustrating an example wireless communication system 1700 in which various aspects described herein can function is provided. In one example, system 1700 is a multiple-input multiple-output (MIMO) system that includes a transmitter system 1710 and a receiver system 1750. It should be appreciated, however, that transmitter system 1710 and/or receiver system 1750 could also be applied to a multi-input single-output system wherein, for example, multiple transmit antennas (e.g., on a base station), can transmit one or more symbol streams to a single antenna device (e.g., a mobile station). Additionally, it should be appreciated that aspects of transmitter system 1710 and/or receiver system 1750 described herein could be utilized in connection with a single output to single input antenna system.

In accordance with one aspect, traffic data for a number of data streams are provided at transmitter system 1710 from a data source 1712 to a transmit (TX) data processor 1714. In one example, each data stream can then be transmitted via a respective transmit antenna 1724. Additionally, TX data processor 1714 can format, encode, and interleave traffic data for each data stream based on a particular coding scheme selected for each respective data stream in order to provide coded data. In one example, the coded data for each data stream can then be multiplexed with pilot data using OFDM techniques. The pilot data can be, for example, a known data pattern that is processed in a known manner. Further, the pilot data can be used at receiver system 1750 to estimate channel response. Back at transmitter system 1710, the multiplexed pilot and coded data for each data stream can be modulated (e.g., symbol mapped) based on a particular modulation scheme (e.g., BPSK, QSPK, M-PSK, or M-QAM) selected for each respective data stream in order to provide modulation symbols. In one example, data rate, coding, and modulation for each data stream can be determined by instructions performed on and/or provided by processor 1730.

Next, modulation symbols for all data streams can be provided to a TX processor 1720, which can further process the modulation symbols (e.g., for OFDM). TX MIMO processor 1720 can then provides $N_T$ modulation symbol streams to $N_T$ transceivers 1722a through 1722t. In one example, each transceiver 1722 can receive and process a respective symbol stream to provide one or more analog signals. Each transceiver 1722 can then further condition (e.g., amplify, filter, and upconvert) the analog signals to provide a modulated signal suitable for transmission over a MIMO channel. Accordingly, $N_T$ modulated signals from transceivers 1722a through 1722t can then be transmitted from $N_T$ antennas 1724a through 1724t, respectively.

In accordance with another aspect, the transmitted modulated signals can be received at receiver system 1750 by $N_R$ antennas 1752a through 1752r. The received signal from each antenna 1752 can then be provided to respective transceivers 1754. In one example, each transceiver 1754 can condition (e.g., filter, amplify, and downconvert) a respective received signal, digitize the conditioned signal to provide samples, and then processes the samples to provide a corresponding "received" symbol stream. An RX MIMO/data processor 1760 can then receive and process the $N_R$ received symbol streams from $N_R$ transceivers 1754 based on a particular receiver processing technique to provide $N_T$ "detected" symbol streams. In one example, each detected symbol stream can include symbols that are estimates of the modulation symbols transmitted for the corresponding data stream. RX processor 1760 can then process each symbol stream at least in part by demodulating, deinterleaving, and decoding each detected symbol stream to recover traffic data for a corresponding data stream. Thus, the processing by RX processor 1760 can be complementary to that performed by TX MIMO processor 1720 and TX data processor 1716 at transmitter system 1710. RX processor 1760 can additionally provide processed symbol streams to a data sink 1764.

In accordance with one aspect, the channel response estimate generated by RX processor 1760 can be used to perform space/time processing at the receiver, adjust power levels, change modulation rates or schemes, and/or other appropriate actions. Additionally, RX processor 1760 can further estimate channel characteristics such as, for example, signal-to-noise-and-interference ratios (SNRs) of the detected symbol streams. RX processor 1760 can then provide estimated channel characteristics to a processor 1770. In one example, RX processor 1760 and/or processor 1770 can further derive an estimate of the "operating" SNR for the system. Processor 1770 can then provide channel state information (CSI), which can comprise information regarding the communication link and/or the received data stream. This information can include, for example, the operating SNR. The CSI can then be processed by a TX data processor 1718, modulated by a modulator 1780, conditioned by transceivers 1754a through 1754r, and transmitted back to transmitter system 1710. In addition, a data source 1716 at receiver system 1750 can provide additional data to be processed by TX data processor 1718.

Back at transmitter system 1710, the modulated signals from receiver system 1750 can then be received by antennas 1724, conditioned by transceivers 1722, demodulated by a demodulator 1740, and processed by a RX data processor 1742 to recover the CSI reported by receiver system 1750. In one example, the reported CSI can then be provided to processor 1730 and used to determine data rates as well as coding and modulation schemes to be used for one or more data streams. The determined coding and modulation schemes can then be provided to transceivers 1722 for quantization and/or use in later transmissions to receiver system 1750. Additionally and/or alternatively, the reported CSI can be used by processor 1730 to generate various controls for TX data processor 1714 and TX MIMO processor 1720. In another example, CSI and/or other information processed by RX data processor 1742 can be provided to a data sink 1744.

In one example, processor 1730 at transmitter system 1710 and processor 1770 at receiver system 1750 direct operation at their respective systems. Additionally, memory 1732 at transmitter system 1710 and memory 1772 at receiver system 1750 can provide storage for program codes and data used by processors 1730 and 1770, respectively. Further, at receiver system 1750, various processing techniques can be used to process the $N_R$ received signals to detect the $N_T$ transmitted symbol streams. These receiver processing techniques can include spatial and space-time receiver processing techniques, which can also be referred to as equalization techniques, and/or "successive nulling/equalization and interference cancellation" receiver processing techniques, which can also be referred to as "successive interference cancellation" or "successive cancellation" receiver processing techniques.

It is to be understood that the aspects described herein can be implemented by hardware, software, firmware, middleware, microcode, or any combination thereof. When the systems and/or methods are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

What has been described above includes examples of one or more aspects. It is, of course, not possible to describe every conceivable combination of components or methodologies for purposes of describing the aforementioned aspects, but one of ordinary skill in the art can recognize that many further combinations and permutations of various aspects are possible. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is meant to be a "non-exclusive or."

What is claimed is:

1. A method, comprising:
    receiving, at a user equipment (UE), at least one positioning assistance message generated by a location server, the at least one positioning assistance message comprising reference base station parameters relating to a reference base station and one or more non-reference base station parameters relating to at least one non-reference base station;
    determining, by the UE based on the at least one positioning assistance message, that a value of at least one omitted parameter of the at least one non-reference base station is substantially identical to a value of at least one corresponding reference base station parameter, wherein the at least one omitted parameter of the at least one non-reference base station is omitted from the received one or more non-reference base station parameters relating to the at least one non-reference base station and a first parameter of the at least one omitted parameters is a slot timing parameter; and
    computing, by the UE, a time difference of arrival between respective reference signals transmitted by the reference base station and the at least one non-reference base station using the value of the at least one corresponding reference base station parameter for the value of the at least one omitted parameter of the at least one non-reference base station.

2. The method of claim 1, wherein the receiving comprises receiving the at least one positioning assistance message from the location server.

3. The method of claim 1, wherein the receiving comprises receiving the at least one positioning assistance message from a serving base station.

4. The method of claim 1, wherein the reference base station is a serving base station.

5. The method of claim 1, wherein the reference base station is a non-serving base station.

6. The method of claim 1, wherein the at least one non-reference base station comprises respective base stations that neighbor a serving base station.

7. The method of claim 1, wherein:
    the reference base station parameters comprise a positioning reference signal (PRS) bandwidth utilized by the reference base station and the at least one omitted parameter of the at least one non-reference base station comprises a PRS bandwidth utilized by the at least one non-reference base station;
    the at least one omitted parameter of the at least one non-reference base station indicates that the PRS bandwidth utilized by the reference base station matches the PRS bandwidth utilized by the at least one non-reference base station; and the method further comprises receiving supplemental information relating to a PRS bandwidth utilized by an other non-reference base station, the other non-reference base station utilizing a different PRS bandwidth from the reference base station.

8. The method of claim 1, wherein:

the reference base station parameters comprise an antenna port configuration utilized by the reference base station and the at least one omitted parameter of the at least one non-reference base station comprises an antenna port configuration utilized by the at least one non-reference base station;

the at least one omitted parameter of the at least one non-reference base station indicates that the antenna port configuration utilized by the reference base station matches the antenna port configuration utilized by the at least one non-reference base station; and the method further comprises receiving supplemental information relating to an antenna port configuration utilized by an other non-reference base station, the other non-reference base station utilizing a different antenna port configuration from the reference base station.

9. A wireless communications apparatus, comprising:

a memory that stores data relating to a reference base station and at least one non-reference base station; and a processor configured to receive at least one positioning assistance message that was generated by a location server and that includes reference base station parameters relating to the reference base station and one or more non-reference base station parameters relating to the at least one non-reference base station, to determine, based on the at least one positioning assistance message, that a value of at least one omitted parameter of the at least one non-reference base station is substantially identical to a value of at least one corresponding reference base station parameter, wherein the at least one omitted parameter of the at least one non-reference base station is omitted from the received one or more non-reference base station parameters relating to the at least one non-reference base station and a first parameter of the at least one omitted parameters is a slot timing parameter, and to compute a time difference of arrival between respective reference signals transmitted by the reference base station and the at least one non-reference base station using the value of the at least one omitted parameter of the at least one non-reference base station.

10. The wireless communications apparatus of claim 9, wherein the processor is further configured to receive the at least one positioning assistance message from at least one of the location server or a serving base station.

11. The wireless communications apparatus of claim 9, wherein the at least one non-reference base station comprises respective base stations that neighbor a serving base station.

12. The wireless communications apparatus of claim 9, wherein the reference base station parameters comprise a positioning reference signal (PRS) bandwidth utilized by the reference base station and the at least one omitted parameter of the at least one non-reference base station comprises a PRS bandwidth utilized by the at least one non-reference base station, wherein the at least one omitted parameter of the at least one non-reference base station indicates that the PRS bandwidth utilized by the reference base station matches the PRS bandwidth utilized by the at least one non-reference base station, and wherein the processor is further configured to receive supplemental information relating to a PRS bandwidth utilized by an other non-reference base station, the other non-reference base station utilizing a different PRS bandwidth from the reference base station.

13. The wireless communications apparatus of claim 9, wherein the reference base station parameters comprise an antenna port configuration utilized by the reference base station and the at least one omitted parameter of the at least one non-reference base station comprises an antenna port configuration utilized by the at least one non-reference base station, wherein the at least one omitted parameter of the at least one non-reference base station indicates that the antenna port configuration utilized by the reference base station matches the antenna port configuration utilized by the at least one non-reference base station, and wherein the processor is further configured to receive supplemental information relating to an antenna port configurations utilized by an other non-reference base station, the other non-reference base station utilizing a different antenna port configuration from the reference base station.

14. An apparatus, comprising:

means for receiving at least one positioning assistance message generated by a location server that includes reference cell parameters relating to a reference cell and one or more non-reference cell parameters relating to at least one non-reference cell;

means for determining, based on the at least one positioning assistance message, that a value of at least one omitted parameter of the at least one non-reference cell is equivalent to a value of at least one corresponding reference cell parameter, wherein the at least one omitted parameter of the at least one non-reference cell is omitted from the received one or more non-reference cell parameters relating to the at least one non-reference cell and a first parameter of the at least one omitted parameters is a slot timing parameter; and means for computing a time difference of arrival between respective reference signals transmitted by the reference cell and the at least one non-reference cell using the value of the at least one corresponding reference cell parameter for the value of the at least one omitted parameter of the at least one non-reference cell.

15. The apparatus of claim 14, wherein:

the reference cell parameters comprise a positioning reference signal (PRS) bandwidth utilized by the reference cell and the at least one omitted parameter of the at least one non-reference cell comprises a PRS bandwidth utilized by the at least one non-reference cell;

the at least one omitted parameter of the at least one non-reference cell indicates that the PRS bandwidth utilized by the reference cell is equivalent to a PRS bandwidth utilized by the at least one non-reference cell; and the apparatus further comprises means for receiving supplemental information relating to a PRS bandwidth utilized by an other non-reference cell, the other non-reference cell utilizing a different PRS bandwidth from the reference cell.

16. The apparatus of claim 14, wherein:

the reference cell parameters comprise a transmit antenna configuration utilized by the reference cell and the at least one omitted parameter of the at least one non-reference cell comprises a transmit antenna configuration utilized by the at least one non-reference cell;

the at least one omitted parameter of the at least on non-reference cell indicates that the transmit antenna configuration utilized by the reference cell is equivalent to a transmit antenna configuration utilized by the at least one non-reference cell; and the apparatus further comprises means for receiving supplemental information relating to a transmit antenna configuration utilized by an other non-reference cell, the other non-reference cell utilizing a different transmit antenna configuration from the reference cell.

17. A computer program product, comprising:

a non-transitory computer-readable medium, comprising:
  code for causing a computer to receive at least one positioning assistance message generated by a location server and that includes reference cell parameters relating to a reference cell and one or more non-reference cell parameters relating to at least one non-reference cell;
  code for causing the computer to determine, based on the at least one positioning assistance message, that a value of at least one omitted parameter of the at least one non-reference cell is equivalent to a value of at least one corresponding reference cell parameter, wherein the at least one omitted parameter of the at least one non-reference cell is omitted from the received one or more non-reference cell parameters relating to the at least one non-reference cell; and
  code for causing the computer to compute a time difference of arrival between respective reference signals transmitted by the reference cell and the at least one non-reference cell using the value of the at least one corresponding reference cell parameter for the value of the at least one omitted parameter of the at least one non-reference cell.

18. The computer program product of claim 17, wherein:

the reference cell parameters comprise a positioning reference signal (PRS) bandwidth utilized by the reference cell and the at least one omitted parameter of the at least one non-reference cell comprises a PRS bandwidth utilized by the at least one non-reference cell;

the at least one omitted parameter of the at least one non-reference cell indicates that the PRS bandwidth utilized by the reference cell is equivalent to the PRS bandwidth utilized by the at least one non-reference cell; and the non-transitory computer-readable medium further comprises code for causing a computer to receive supplemental information relating to a PRS bandwidth utilized by an other non-reference cell, the other non-reference cell utilizing a different PRS bandwidth from the reference cell.

19. The computer program product of claim 17, wherein:

the reference cell parameters comprise a transmit antenna configuration utilized by the reference cell and the at least one omitted parameter of the at least one non-reference cell comprises a transmit antenna configuration utilized by the at least one non-reference cell;

the at least one omitted parameter of the at least one non-reference cell indicates that the transmit antenna configuration utilized by the reference cell is equivalent to the transmit antenna configuration utilized by the at least one non-reference cell; and the non-transitory computer-readable medium further comprises code for causing a computer to receive supplemental information relating to a transmit antenna configuration utilized by an other non-reference cell, the other non-reference cell utilizing a different transmit antenna configuration from the reference cell.

* * * * *